United States Patent
Matthews et al.

(10) Patent No.: US 11,943,128 B1
(45) Date of Patent: *Mar. 26, 2024

(54) PATH TELEMETRY DATA COLLECTION

(71) Applicant: Innovium, Inc., San Jose, CA (US)

(72) Inventors: William Brad Matthews, Los Gatos, CA (US); Puneet Agarwal, Santa Clara, CA (US); Meg Pei Lin, Saratoga, CA (US); Rupa Budhia, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,546

(22) Filed: Feb. 10, 2023

Related U.S. Application Data

(63) Continuation of application No. 17/091,904, filed on Nov. 6, 2020, now Pat. No. 11,621,904.

(51) Int. Cl.
*H04L 43/10* (2022.01)
*H04L 69/22* (2022.01)

(52) U.S. Cl.
CPC .............. *H04L 43/10* (2013.01); *H04L 69/22* (2013.01)

(58) Field of Classification Search
CPC .............................. H04L 43/10; H04L 69/22
See application file for complete search history.

(56) References Cited

U.S. PATENT DOCUMENTS

| | | | |
|---|---|---|---|
| 5,805,602 A | 9/1998 | Cloutier et al. | |
| 6,011,805 A | 1/2000 | Esteve et al. | |
| 6,373,399 B1 | 4/2002 | Johnson et al. | |
| 6,625,151 B1 | 9/2003 | Alowersson et al. | |
| 6,650,621 B1 | 11/2003 | Maki-Kullas | |
| 6,721,316 B1 | 4/2004 | Epps et al. | |
| 6,865,160 B1 | 3/2005 | Bare | |
| 6,977,930 B1 | 12/2005 | Epps et al. | |
| 7,149,187 B1 | 12/2006 | Jacobson et al. | |

(Continued)

FOREIGN PATENT DOCUMENTS

CN 111183624 A 5/2020

OTHER PUBLICATIONS

U.S. Appl. No. 17/091,916, Notice of Allowance dated May 26, 2023.

(Continued)

*Primary Examiner* — Oanh Duong
(74) *Attorney, Agent, or Firm* — Shield Intellectual Property PC; Kirk D. Wong

(57) ABSTRACT

A switch or other network device may be configured as an ingress edge telemetry node in a telemetry domain. The ingress edge telemetry node may clone certain data units it processes, for example in response to certain telemetry triggers being met. The ingress edge telemetry node may further inject telemetry and/or other data into the cloned data unit. The cloned data unit continues along the same path as the original data unit until it reaches an egress edge telemetry node in the telemetry domain. The second node extracts the telemetry data from the cloned data unit and sends telemetry information based thereon to a telemetry collector, while the original data unit continues to its final destination. Nodes along the path between the first node and the second node may be configured as transit telemetry nodes that insert or otherwise update the telemetry data.

20 Claims, 7 Drawing Sheets

(56) References Cited

U.S. PATENT DOCUMENTS

| | | |
|---|---|---|
| 7,295,562 B1 | 11/2007 | Acharya et al. |
| 7,360,217 B2 | 4/2008 | Melvin et al. |
| 7,382,244 B1 | 6/2008 | Donovan et al. |
| 7,813,348 B1 | 10/2010 | Gupta et al. |
| 7,898,959 B1 | 3/2011 | Arad |
| 8,004,990 B1 | 8/2011 | Callon |
| 8,281,033 B1 | 10/2012 | Riordan et al. |
| 8,588,242 B1 | 11/2013 | Izenberg et al. |
| 9,489,401 B1 | 11/2016 | Garcia et al. |
| 9,565,114 B1 | 2/2017 | Kabbani et al. |
| 9,805,018 B1 | 10/2017 | Richfield |
| 9,979,624 B1 | 5/2018 | Volpe et al. |
| 10,063,488 B2 | 8/2018 | Oran |
| 10,313,255 B1 | 6/2019 | Matthews et al. |
| 10,320,691 B1 | 6/2019 | Matthews et al. |
| 10,389,643 B1 | 8/2019 | Matthews et al. |
| 10,505,849 B1 | 12/2019 | Iny et al. |
| 10,673,770 B1 | 6/2020 | Matthews et al. |
| 10,713,079 B2 | 7/2020 | Muramatti et al. |
| 10,721,187 B1 | 7/2020 | Goldman et al. |
| 10,735,339 B1 | 8/2020 | Matthews |
| 11,621,904 B1 * | 4/2023 | Matthews ............ H04L 43/10 709/241 |
| 2002/0133617 A1 | 9/2002 | Davies |
| 2003/0093567 A1 | 5/2003 | Lolayekar et al. |
| 2003/0131122 A1 | 7/2003 | Kondo et al. |
| 2003/0142685 A1 | 7/2003 | Bare |
| 2003/0152076 A1 | 8/2003 | Lee et al. |
| 2003/0154328 A1 | 8/2003 | Henderson et al. |
| 2003/0210695 A1 | 11/2003 | Henrion |
| 2003/0231646 A1 | 12/2003 | Chandra et al. |
| 2004/0196790 A1 | 10/2004 | Balakrishnan et al. |
| 2004/0218925 A1 | 11/2004 | Nahm |
| 2005/0007959 A1 | 1/2005 | Tomonaga et al. |
| 2005/0007961 A1 | 1/2005 | Scott et al. |
| 2005/0013248 A1 | 1/2005 | Mekkittikul et al. |
| 2005/0068970 A1 | 3/2005 | Srikrishna et al. |
| 2005/0086363 A1 | 4/2005 | Ji |
| 2005/0281279 A1 | 12/2005 | Dennison et al. |
| 2006/0036821 A1 | 2/2006 | Frey et al. |
| 2006/0067213 A1 | 3/2006 | Evans et al. |
| 2006/0117099 A1 | 6/2006 | Mogul |
| 2006/0218556 A1 | 9/2006 | Nemirovsky et al. |
| 2006/0274760 A1 | 12/2006 | Loher |
| 2007/0028003 A1 | 2/2007 | Rudkin |
| 2007/0091802 A1 | 4/2007 | Pan et al. |
| 2007/0195778 A1 | 8/2007 | Tatar et al. |
| 2007/0280117 A1 | 12/2007 | Katz et al. |
| 2008/0112343 A1 | 5/2008 | Oleszczuk |
| 2008/0212613 A1 | 9/2008 | Perkinson et al. |
| 2008/0259800 A1 | 10/2008 | Clark et al. |
| 2009/0010248 A1 | 1/2009 | Kanai |
| 2009/0028045 A1 | 1/2009 | Stellenberg et al. |
| 2009/0063431 A1 | 3/2009 | Erol et al. |
| 2009/0075668 A1 | 3/2009 | Rao |
| 2009/0109858 A1 | 4/2009 | Yamasaki et al. |
| 2009/0190591 A1 | 7/2009 | Sankaran |
| 2009/0304014 A1 | 12/2009 | Evans et al. |
| 2010/0046524 A1 | 2/2010 | Rune et al. |
| 2010/0091782 A1 | 4/2010 | Hiscock |
| 2010/0309783 A1 | 12/2010 | Howe |
| 2011/0051602 A1 | 3/2011 | Matthews et al. |
| 2011/0280126 A1 | 11/2011 | Fefer et al. |
| 2012/0008496 A1 | 1/2012 | Saavedra |
| 2012/0063451 A1 | 3/2012 | Keesara et al. |
| 2012/0201241 A1 | 8/2012 | Subramanian et al. |
| 2012/0236860 A1 | 9/2012 | Kompella et al. |
| 2012/0254931 A1 | 10/2012 | Oztaskent et al. |
| 2013/0259037 A1 | 10/2013 | Natarajan et al. |
| 2013/0329577 A1 | 12/2013 | Suzuki et al. |
| 2014/0092736 A1 | 4/2014 | Baillargeon |
| 2014/0105025 A1 | 4/2014 | Lavian et al. |
| 2014/0126396 A1 | 5/2014 | Matthews et al. |
| 2014/0126573 A1 | 5/2014 | Matthews et al. |
| 2014/0169189 A1 | 6/2014 | Kalkunte |
| 2014/0219087 A1 | 8/2014 | Matthews et al. |
| 2014/0247740 A1 | 9/2014 | Koo |
| 2014/0369426 A1 | 12/2014 | Li et al. |
| 2015/0016258 A1 | 1/2015 | Okner et al. |
| 2015/0016266 A1 | 1/2015 | Dumitrescu et al. |
| 2015/0043330 A1 | 2/2015 | Hu et al. |
| 2015/0124608 A1 | 5/2015 | Agarwal et al. |
| 2015/0139540 A1 | 5/2015 | Moraleda et al. |
| 2015/0295827 A1 | 10/2015 | Zhu et al. |
| 2016/0044695 A1 | 2/2016 | Gunner |
| 2016/0072717 A1 | 3/2016 | Ansari et al. |
| 2016/0087894 A1 | 3/2016 | Chen et al. |
| 2016/0134915 A1 | 5/2016 | Oran |
| 2016/0164792 A1 | 6/2016 | Oran |
| 2016/0254992 A1 | 9/2016 | Torvi et al. |
| 2016/0261500 A1 | 9/2016 | Revah et al. |
| 2016/0269284 A1 | 9/2016 | Cheng et al. |
| 2016/0308769 A1 | 10/2016 | Versteeg et al. |
| 2016/0373199 A1 | 12/2016 | Olofsson et al. |
| 2017/0048147 A1 | 2/2017 | Vaidya |
| 2017/0111264 A1 | 4/2017 | Shankarappa et al. |
| 2017/0126547 A1 | 5/2017 | Wood et al. |
| 2017/0134282 A1 | 5/2017 | Agarwal et al. |
| 2017/0149678 A1 | 5/2017 | Dumitrescu et al. |
| 2017/0279728 A1 | 9/2017 | Oran |
| 2018/0091388 A1 | 3/2018 | Levy et al. |
| 2018/0159800 A1 | 6/2018 | Tietz et al. |
| 2018/0356837 A1 | 12/2018 | Lisewski et al. |
| 2019/0089644 A1 | 3/2019 | Shpiner et al. |
| 2020/0007454 A1 | 1/2020 | Frink |
| 2020/0053026 A1 | 2/2020 | Rangachari et al. |
| 2020/0106710 A1 | 4/2020 | Ryoo et al. |
| 2020/0136973 A1 | 4/2020 | Rahman et al. |
| 2020/0249979 A1 | 8/2020 | Muramatti et al. |
| 2020/0274811 A1 | 8/2020 | Srivastava et al. |
| 2021/0021545 A1 | 1/2021 | Srivastava et al. |
| 2021/0243094 A1 | 8/2021 | Holness et al. |
| 2021/0409313 A1 | 12/2021 | Iorga et al. |
| 2022/0045972 A1 | 2/2022 | Aibester et al. |
| 2022/0150171 A1 | 5/2022 | Matthews et al. |

OTHER PUBLICATIONS

U.S. Appl. No. 17/352,583, Final Office Action dated May 15, 2023.

U.S. Appl. No. 17/367,330, Notice of Allowance dated Mar. 24, 2023.

U.S. Appl. No. 17/385,503, Non-Final Office Action dated Apr. 7, 2023.

U.S. Appl. No. 16/527,278, filed Jul. 31, 2019, William Brad Matthews.

U.S. Appl. No. 16/575,343, filed Sep. 18, 2019, William Brad Matthews.

Sinha et al. "Harnessing TCP's Burstiness with Flowlet Switching." (2004).

U.S. Appl. No. 15/407,149, Non-Final Office Action dated Aug. 28, 2018.

U.S. Appl. No. 15/407,149, Notice of Allowance dated Jan. 25, 2019.

U.S. Appl. No. 15/407,156, Notice of Allowance dated Jan. 24, 2019.

U.S. Appl. No. 15/407,159, Advisory Action dated Nov. 1, 2019.

U.S. Appl. No. 15/407,159, Final Office Action dated Aug. 13, 2019.

U.S. Appl. No. 15/407,159, Non-Final Office Action dated Jan. 4, 2019.

U.S. Appl. No. 15/407,159, Notice of Allowance dated Mar. 25, 2020.

U.S. Appl. No. 15/410,607, Final Office Action dated Dec. 18, 2018.

U.S. Appl. No. 15/410,607, Non-Final Office Action dated May 17, 2018.

U.S. Appl. No. 15/410,607, Notice of Allowance dated Apr. 3, 2019.

U.S. Appl. No. 15/410,644, Final Office Action dated Oct. 11, 2018.

U.S. Appl. No. 15/410,644, Non-Final Office Action dated May 3, 2018.

U.S. Appl. No. 15/410,644, Notice of Allowance dated Jan. 28, 2019.

U.S. Appl. No. 15/410,651, Final Office Action dated Oct. 11, 2018.

(56) References Cited

OTHER PUBLICATIONS

U.S. Appl. No. 15/410,651, Final Office Action dated Jun. 6, 2019.
U.S. Appl. No. 15/410,651, Non-Final Office Action dated May 15, 2018.
U.S. Appl. No. 15/410,651, Non-Final Office Action dated Feb. 15, 2019.
U.S. Appl. No. 15/410,651, Notice of Allowance dated Sep. 24, 2019.
U.S. Appl. No. 15/410,686, Final Office Action dated Nov. 8, 2018.
U.S. Appl. No. 15/410,686, Non-Final Office Action dated May 9, 2018.
U.S. Appl. No. 15/410,686, Notice Of Allowance dated Apr. 9, 2019.
U.S. Appl. No. 15/446,888, Advisory Action dated Mar. 15, 2019.
U.S. Appl. No. 15/446,888, Final Office Action dated Nov. 23, 2018.
U.S. Appl. No. 15/446,888, Non-Final Office Action dated May 10, 2018.
U.S. Appl. No. 15/446,888, Notice of Allowance dated Sep. 24, 2019.
U.S. Appl. No. 15/446,894, Non-Final Office Action dated Jul. 27, 2018.
U.S. Appl. No. 15/446,894, Notice of Allowance dated Feb. 19, 2019.
U.S. Appl. No. 15/446,901, Advisory Action dated Mar. 28, 2019.
U.S. Appl. No. 15/446,901, Final Office Action dated Jan. 15, 2019.
U.S. Appl. No. 15/446,901, Non-Final Office Action dated Aug. 29, 2018.
U.S. Appl. No. 15/446,901, Notice of Allowance dated May 28, 2019.
U.S. Appl. No. 16/288,165, Non-Final Office Action dated Aug. 22, 2019.
U.S. Appl. No. 16/288,165, Notice of Allowance dated Jan. 27, 2020.
U.S. Appl. No. 16/527,278, Non-Final Office Action dated Oct. 13, 2020.
U.S. Appl. No. 16/527,278, Notice of Allowance dated Feb. 19, 2021.
U.S. Appl. No. 16/575,343, Advisory Action dated Jun. 29, 2021.
U.S. Appl. No. 16/575,343, Advisory Action dated Jul. 25, 2022.
U.S. Appl. No. 16/575,343, Final Office Action dated Mar. 31, 2021.
U.S. Appl. No. 16/575,343, Final Office Action dated May 10, 2022.
U.S. Appl. No. 16/575,343, Non-Final Office Action dated Sep. 30, 2020.
U.S. Appl. No. 16/575,343, Non-Final Office Action dated Sep. 28, 2021.
U.S. Appl. No. 16/575,343, Non-Final Office Action dated Sep. 6, 2022.
U.S. Appl. No. 16/575,343, Notice of Allowance dated Jan. 11, 2023.
U.S. Appl. No. 16/595,127, Non-Final Office Action dated Oct. 16, 2020.
U.S. Appl. No. 16/595,127, Notice of Allowance dated Mar. 23, 2021.
U.S. Appl. No. 16/741,510, Notice of Allowance dated Feb. 18, 2021.
U.S. Appl. No. 17/091,904, Non-Final Office Action dated Apr. 28, 2022.
U.S. Appl. No. 17/091,904, Notice of Allowance dated Nov. 17, 2022.
U.S. Appl. No. 17/091,916, Non-Final Office Action dated Mar. 15, 2023.
U.S. Appl. No. 17/352,583, Non-Final Office Action dated Dec. 22, 2022.
World Intellectual Property Organization, Application No. PCT/US22/20087, International Search Report dated Jul. 19, 2022.
U.S. Appl. No. 17/352,583, Notice of Allowance dated Aug. 9, 2023.
U.S. Appl. No. 17/385,503, Notice of Allowance dated Aug. 10, 2023.

* cited by examiner

PATH TELEMETRY DATA COLLECTION

PRIORITY CLAIM

This application claims benefit under 35 U.S.C. § 120 as a Continuation of U.S. application Ser. No. 17/091,904, filed Nov. 6, 2020, the entire contents of which is hereby incorporated by reference as if fully set forth herein.

TECHNICAL FIELD

Embodiments relate generally to computer networking, and, more specifically, to techniques for generating and collecting network telemetry data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of that data, such as packets, cells, or frames, along paths through intermediary networking devices, such as switches or routers, that direct or redirect each data unit towards a corresponding destination. Data transmitted in this manner may be referred to generally as network traffic. Network traffic may be divided into different groupings, known as traffic "flows," based on characteristics of its constituent data units, such as source and destination addresses and ports, data unit types, and/or other data unit attributes.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in some cases the context or state of the network device. The logic within a network device that controls the specific set of actions performed with respect to a given data unit is often referred to as "packet-switching" or "forwarding" logic.

For example, address information specified by or otherwise associated with the data unit, such as a source address, a destination address, or path information, is typically used to determine how to handle a data unit (e.g. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to. Generally, data units within a same traffic flow (e.g. data units of a same type, having a same source address and port, and same destination address and port) are processed similarly.

A network device may include any number of internal hardware and/or software components configured to handle the movement of data units between processing components within the device and, eventually, out of the device. It is desirable for these components to quickly determine where to send and/or store data for processing, and to expediently send and/or store that data to the appropriate destination once determined. Moreover, it is desirable for these components to handle network traffic in a manner that will optimally utilize available network resources throughout the network in which the device is situated.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
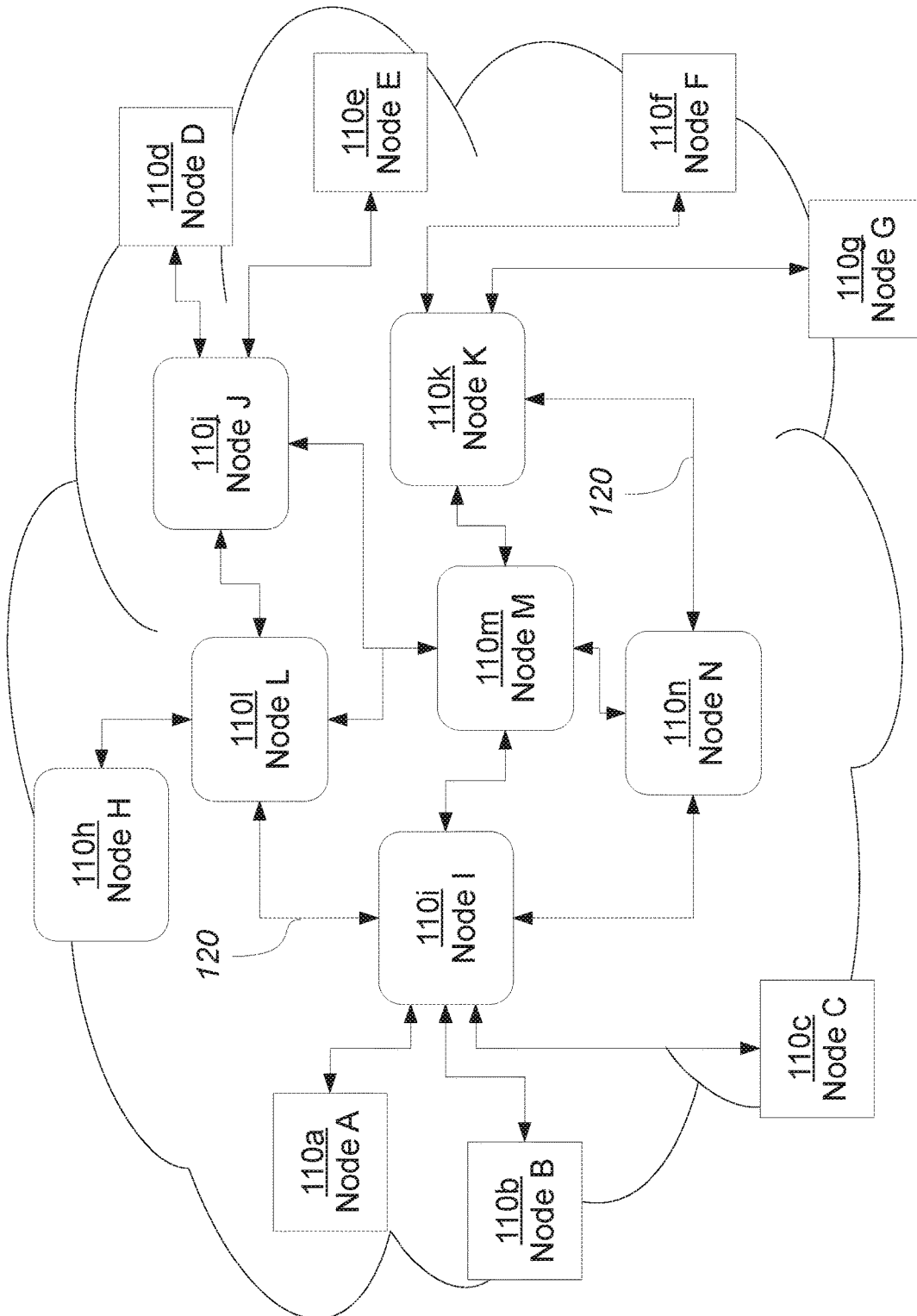
FIG. 1 is an illustrative view of various aspects of an example networking system, also referred to as a network, in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. System Overview
   2.1. Network Nodes
   2.2. Data Units
   2.3. Paths
   2.4. Telemetry Collection
   2.5. Example Device Telemetry Components
   2.6. Example Telemetry Data
   2.7. Miscellaneous
3.0. Functional Overview
4.0. Example Embodiments
5.0 Example Network Device
   5.1 Ports
   5.2 Packet Processors
   5.3 Buffers
   5.4 Queues
   5.5 Traffic Management
   5.6 Forwarding Logic
   5.7 Multi-Pipeline Architecture
   5.8 Miscellaneous
6.0. Implementation Mechanism—Hardware Overview
7.0. Extensions and Alternatives 1.0. General Overview Approaches, techniques, and mechanisms are disclosed for collecting telemetry data within a network. According to an embodiment, a first node on a network is configured as an ingress telemetry node. The first node may receive a data unit for forwarding purposes, and determine to clone it for telemetry purposes, thereby producing a telemetry data unit. The first node may further inject telemetry and/or other data into the cloned data unit. The telemetry data unit continues along the same path as the original data unit until it reaches a second node on the network, referred to as an egress edge telemetry node. The second node extracts the telemetry data from the telemetry data unit and sends telemetry information based thereon to a telemetry collector, while the original data unit continues to its final destination, if that destination is not the second node.

In an embodiment, an ingress edge telemetry node is configured to select data units to generate telemetry data units for based on one or more telemetry triggers. A telemetry trigger includes one or more criteria against which data unit metadata or even payload is compared, and/or against which device state information is compared. A telemetry data unit may be generated for any data unit that matches such criteria, or for any data unit that is being processed when the device state matches the criteria. Or, in an embodiment, a telemetry data unit is generated for only a sample of such data units. A node may have any number of defined telemetry triggers.

In an embodiment, any node along the path between the first node and the second node may be configured to inject further telemetry data into the telemetry data unit, and/or modify the telemetry data already in the telemetry data unit. Any such node is referred as a telemetry transit node. The telemetry information sent by the egress edge telemetry node, which may also be referred to as telemetry report data, may include, or be derived from, this additional telemetry data as well. The egress edge telemetry node may likewise be configured to add to or update the telemetry data.

In an embodiment, the data that the ingress edge telemetry node inserts may include telemetry marking data, such as a telemetry marker in or after a packet header, that indicates to subsequent nodes that a data unit is a telemetry data unit. Based on the marking data, the subsequent node may avoid cloning the clone and/or recognize that it needs to insert or update telemetry data.

According to an embodiment, the inserted telemetry data may include or be based on, without limitation, a node identifier, an identifier for an ingress port over which the data unit arrived, an identifier for an egress port over which the data unit is to be sent, an ingress timestamp, an egress timestamp, an identifier of a queue to which the data unit was assigned, a length of that queue when the data unit was enqueued or dequeued, a measure of delay experienced by the data unit, and so forth.

In an embodiment, the telemetry data unit may be only a partial clone of the original data unit. This may both reduce the bandwidth utilized by telemetry data units and avoid or reduce the likelihood of the telemetry data unit's size growing greater than a maximum transmission unit ("MTU") size as it is annotated with telemetry data. For example, the telemetry data unit may be stripped of all payload data when cloned. Or, the telemetry data unit may be truncated to a specific number of bytes, or to the size of a Transport Data Unit within the node. In an embodiment, the telemetry data unit may be truncated by a telemetry node upon detecting that the telemetry data unit exceeds a certain size.

According to an embodiment, the telemetry information that the egress edge telemetry node sends to the telemetry collector includes all of the telemetry data it receives in the telemetry data unit, plus, optionally, additional telemetry data generated by the egress edge telemetry node. In another embodiment, the telemetry information is a summary report generated by a central processing unit or other logic within the egress edge telemetry node, based on the telemetry data received in the telemetry data unit. In an embodiment, the egress edge telemetry node may determine whether or not to send the telemetry information based on filtering and/or sampling criteria. For instance, the egress edge telemetry node may send the telemetry information only if the extracted telemetry data indicates that the telemetry data unit has experienced an aggregate amount of queue delay over a certain threshold over its entire path. Or, the egress edge telemetry node may send the telemetry information a certain percentage of the time, which percentage may be fixed or may vary based on the observed telemetry data.

According to an embodiment, different network nodes may have different telemetry triggers defined, such that they may generate telemetry data units for different flows or types of data units. There may also be different telemetry triggers for different roles—for instance, a node might have one set of telemetry triggers that indicate data units for which the node may function as an ingress telemetry node, another set of telemetry triggers that indicate data units for which the node may function as a telemetry node, and/or another set of telemetry triggers that indicate data units for which the node may function as an ingress edge telemetry node.

In an embodiment, a transit node may include separate telemetry triggers indicating when it should send a telemetry data unit or a telemetry report based thereon to a telemetry collector (e.g. if the telemetry data unit grows too large, if the telemetry data unit contains data for a maximum number of hops, if an event occurs, etc.), instead of or in addition forwarding the telemetry data unit on. Optionally, the transit node may generate a new telemetry data unit at such times so as to continue collecting telemetry data.

Depending on the embodiment, a telemetry node may inject telemetry data into any telemetry data unit, or only for those that match telemetry triggers defined for that specific node. Similarly, an egress telemetry node may extract data from any telemetry data unit that it receives, or only for those that match telemetry triggers defined for the egress telemetry node, depending on the embodiment.

In an embodiment, a node that is an ingress edge telemetry node for network traffic flowing in one direction may be—but not necessarily is—an egress edge telemetry node for traffic flowing the other direction. In an embodiment, a group of interconnected network nodes that includes one or more ingress edge telemetry nodes, one or more egress edge telemetry nodes, zero or more telemetry transit nodes, and a telemetry collector may be referred to telemetry transit domain. In some embodiments, the telemetry collector or a management node may push telemetry triggers out to all nodes within a telemetry domain, or telemetry triggers may be defined for each node individually.

In some embodiments, among other advantages, by transmitting telemetry data in a cloned data unit instead of injecting the telemetry data in the original data unit, a system may collect telemetry data about the path traveled by a data unit without exceeding the maximum transmission unit size. Further, in some embodiments, using a cloned telemetry data unit instead of injecting the telemetry data in the original data unit avoids the requirement of specialized logic at the end point to parse and interpret the telemetry data, which might otherwise delay application logic in consuming and acting upon the original data unit. Also, in some embodiments, forwarding logic may handle the cloned data unit separately than the original data unit, giving downstream forwarding logic flexibility to drop or reprioritize telemetry data units when extra bandwidth is needed. Or, in an embodiment, forwarding logic may prioritize a telemetry data unit more highly when the telemetry data it carries indicates a high delay measure, so as to more quickly bring such delays to the attention of an administrator and/or network monitoring logic.

In some embodiments, a node is configured to clone a data unit and inject the resulting telemetry data unit into the data unit processing pipeline as quickly as possible, so as to minimize changes to the network state between the time that the original data unit passes through a node and the time that the cloned data unit passes through that node. This may thereby increase the relevance of the collected telemetry data to the original data unit. In an embodiment, for instance, an egress packet processor may determine that telemetry triggers have been met for a newly dequeued data unit and instruct a downstream component, such as the transmit buffer, to forward the original data unit and then send a clone of the data unit to an internal port that recirculates the clone to a traffic manager or ingress arbiter for immediate enqueuing in an egress queue. Such an embodiment may, for instance, result in the telemetry data unit being transmitted within a matter of a few hundred nanoseconds of the original data unit. In another embodiment, the transmit buffer may include specialized hardware configured to generate and transmit the cloned data unit immediately before or after the original data unit.

2.0. System Overview

FIG. 1 is an illustrative view of various aspects of an example networking system 100, also referred to as a network, in which the techniques described herein may be practiced, according to an embodiment.

2.1. Network Nodes

Networking system 100 comprises a plurality of interconnected nodes 110a-110n (collectively nodes 110), each implemented by a different computing device. For example, a node 110 may be a single networking computing device, such as a switch or router, in which some or all of the processing components described herein are implemented in application-specific integrated circuits (ASICs), field programmable gate arrays (FPGAs), or other integrated circuit (s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links 120. Each node 110 may have any number of inbound (ingress) and outbound (egress) network ports, which allow the node 110 to interface with other nodes for communication purposes. The communication links 120 may include any suitable transmission media, such as wired cabling (e.g. copper, optical, etc.) coupled to these ports, and/or wireless communication mechanisms. Note that system 100 illustrates only one of many possible arrangements of nodes 110 within a network. Other networks may include fewer or additional nodes 110 having any number of links 120 between them.

In an embodiment, nodes 110 may generally be classified as either terminal nodes, corresponding to nodes 110a-h, or intermediary nodes, corresponding to nodes 110i-n. Terminal nodes 110a-h typically have a small number of communication links 120 within network 100—often a single link 120—and are generally only senders or consumers of network traffic within network 100. By contrast, intermediary nodes 110i-n may have a significant number of communication links 120 to a larger number of other nodes 110, and generally function as switches that relay network traffic from one node 110 to another. Hence, intermediary nodes 110i-n typically comprise various components for implementing forwarding logic, such as described elsewhere herein, whereas terminal nodes 110a-h may not necessarily have such logic, depending on the embodiment.

In an embodiment, intermediary nodes 110*i-n* may be divided into leaf nodes 110*i-k* and spine nodes 110*l-m*. Leaf nodes 110*i-k* provide terminal nodes 110*a-g* with access to nodes 110*a-g* that may be connected to other leaf nodes 110*i-k*. Leaf nodes 110*i-k* may be, for instance, top-of-rack or end-of-rack switch devices. Spine nodes 110*l-n* interconnect leaf nodes 110*i-k* and/or other spine nodes 110*i-k*. Spine nodes 110*l-n* may be, for instance, spine switch devices. Optionally, certain terminal nodes, such as node 110*h*, may connect directly to one or more spine nodes 110*l-n* for management or other purposes. In yet other embodiments, nodes 110*h-n* may be divided in other manners, such as into core, aggregation, and access nodes, depending on the network architecture.

In an embodiment, network 100 may be a data center, cloud, etc. In an embodiment, some or all of nodes 110*a-g* may be "host" nodes that host various servers or other applications. In an embodiment, some or all of nodes 110*a-g* may be "edge" nodes, such as gateway, firewall, and/or load-balancing devices, that provide outside devices and/or networks with access to network 100. Such devices may have a number of external facing ports to connect to these devices and/or networks. In yet other embodiments, some or all of nodes 110 *a-g* may be client devices, such as personal computers, smartphones, and so forth.

Although only nodes 110*a-n* are depicted, in other embodiments, a network 100 may be significantly larger, comprising many more terminal nodes 110*a-h* and intermediary nodes 110*i-n*, with topologies of various complexities. The path between two nodes in a network 100 may be significantly longer depending on the topology and/or network conditions. Moreover, in some embodiments, network 100 may be smaller than depicted.

2.2. Data Units

While each node 110 may or may not have a variety of other functions, in an embodiment, each node 110 is configured to send, receive, and/or relay data to one or more other nodes 110 via the links 120. In general, data is communicated as series of discrete units or structures represented by signals transmitted over the communication links 120.

When a node 110 receives a unit of data, it may examine addressing information and/or other information within the unit of data to determine how to process the unit (e.g. whether the node 110 is the intended recipient, or the data unit should be forwarded on to another node 110). The addressing information may be, for instance, a Media Access Control ("MAC") address, Internet Protocol (IP) address, MPLS label, and/or any other suitable information. Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node 110 the meaning of the field.

Different nodes 110 within a network 100 may send, receive, and/or forward data units at different communication levels, or layers. For instance, a first node 110 may send a unit of data at the transport layer (e.g. a TCP segment) to a second node 110 over a path that includes an intermediate node 110. This unit of data, which may sometimes first be broken into smaller units, may be encapsulated in units of data at various sublevels before it is transmitted from the first node 110. For example, a TCP segment may be encapsulated into IP packets, those IP packets may be encapsulated into Ethernet frames, and those Ethernet frames may eventually be sent out as a collection of signal-encoded bits to the intermediate device. Depending on the network layer at which the device operates, the intermediate node 110 may examine, and in some cases reconstruct, the original frames, packets, and/or segment before forwarding that data to the second node 110. Or, the intermediate node 110 may simply examine the frames, or in some cases the packets as well, and forward the data to the second node 110 without ever examining the original segment (or, in some cases, the packet).

Data units of the network layer at which a node 110 operates are considered protocol data units ("PDUs"), such as, without limitation, IP packets for the network layer (layer 3), frames for the Ethernet layer (layer 2), etc. A PDU may, for data unit handling purposes both within and without the device, be broken up into smaller subunits, or portions. The node 110 need not necessarily ever assemble the data in a PDU together, but rather may in an embodiment act upon constituent portions of the PDU, which may be linked together by identifiers, linked lists, or other suitable constructs. Within a node itself, these portions are referred to herein as transport data units ("TDUs"). For instance, if the PDU is a packet, the TDU might be one or more cells.

For convenience, many of the techniques described in this disclosure are described with respect to embodiments where the PDUs are IP packets in a L3 (level 3) network, and the TDUs are constituent cells and/or frames in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the PDUs and TDUs are of any other types of data structures, such as segments, InfiniBand Messages, or datagrams. That is, in these contexts, other types of data structures may be used in place of packets, cells, frames, and so forth.

2.3. Paths

Any node in the depicted network 100 may communicate with any other node in the network 100 by sending data units through a series of nodes 110 and links, referred to as a path. For example, Node B (110*b*) may send data units to Node D (110*d*) via a path from Node B to Node I to Node L to Node J to Node D. Depending on the size of network 100, there may be a large number of valid paths between two nodes. For example, another path from Node B to Node D is from Node B to Node I to Node M to Node J to Node D.

In an embodiment, a node 110 does not actually need to specify a full path for a data unit that it sends. Rather, the node 110 may simply be configured to calculate the best path for the data unit out of the device (e.g. which egress port it should send the data unit out on). When a node 110 receives a data unit (e.g. via an ingress port) that is not addressed directly to the node 110, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

For example, certain nodes 110, such as switches and/or routers, may include forwarding logic that analyzes destination address(es) and/or other header information within a data unit to identify a specific one of its egress ports that should send the data unit. The forwarding logic may, for instance, lookup or compare a destination address to forwarding instructions within a forwarding table, and resolve the egress port to send the data unit to. The forwarding instructions may indicate, for instance, an egress port over which to send the unit of data, a label to attach the unit of data, etc. The node 110 may then send the data unit out the resolved egress port, which results in the data unit proceeding along a corresponding communication link to the next hop in its path.

Where multiple ports provide valid paths to the destination, the forwarding logic may further utilize other header information and/or load balancing logic to resolve the data unit to a specific one of these ports. As a result, it is possible for a node to send two data units to the same destination via different ports/paths. In an embodiment, a node may utilize various data within a data unit to classify the data unit as belonging to a specific traffic flow. While different traffic flows may be assigned to different ports/paths, the forwarding logic of a node 110 is such that, within a specific time window, all data units that belong to a specific traffic flow are assigned to the same port/path.

2.4. Telemetry Collection

Figure 2:
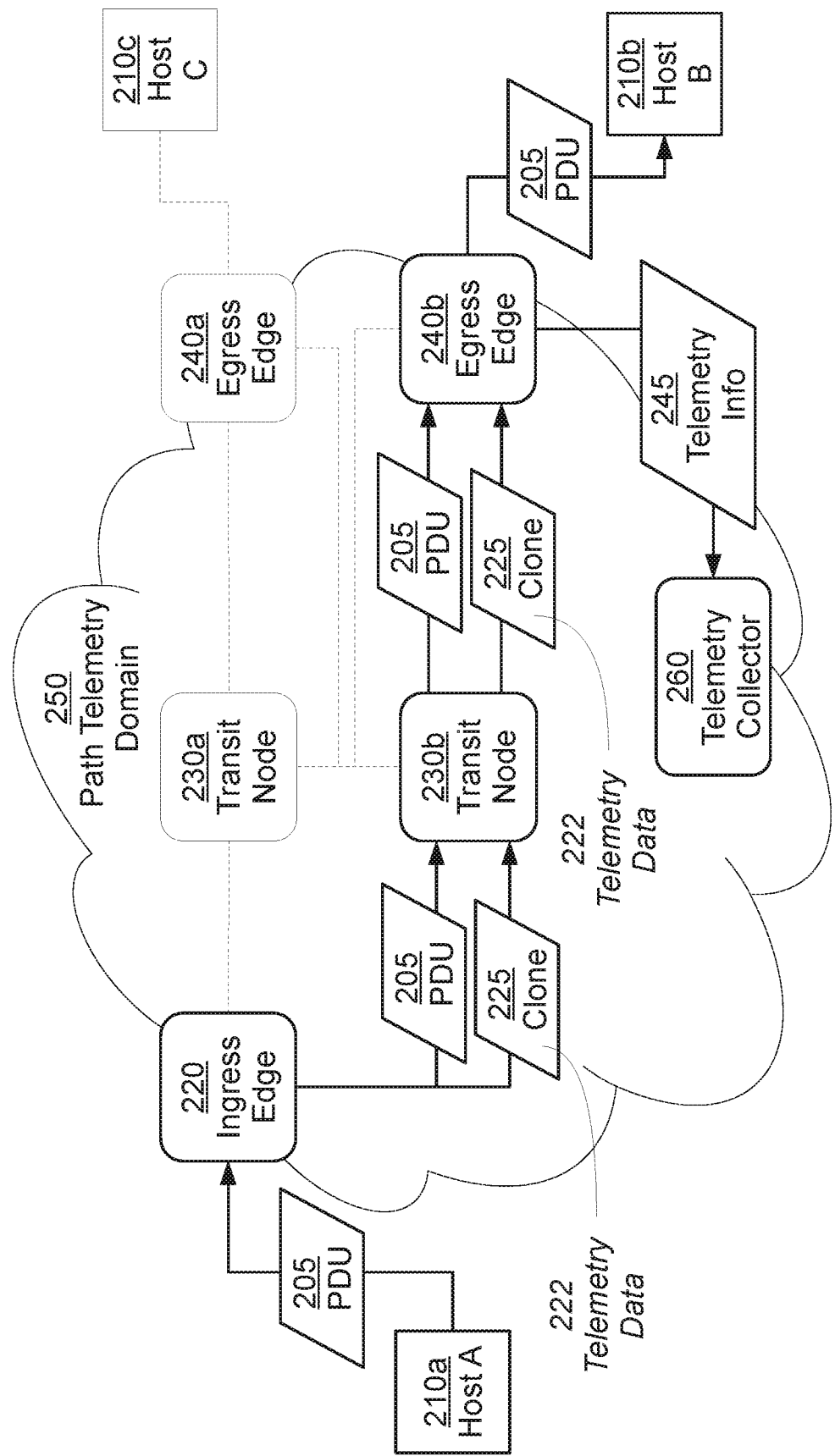
FIG. 2 illustrates the collection of telemetry data within a network using a telemetry domain.

FIG. 2 illustrates the collection of telemetry data within a network 200 using a telemetry domain 250, according to an embodiment. Network 200 may be, for example, similar to network 100, in that it comprises a plurality of nodes interconnected by communication links. In the case of network 200, these nodes may include host nodes 210, edge nodes 220/240, and transit nodes 230, all of which are network devices. For instance, host nodes 210 may be examples of terminal nodes 110a-g, while edge nodes 220/240 and transit nodes 230 may be examples of intermediary nodes 110i-n (e.g. leaf nodes and/or spine nodes). While only a limited number of nodes are depicted for illustrative purposes, it will be understood that network 200 may comprise many such nodes.

FIG. 2 illustrates the path of a single PDU 205 through the network 200. Host 210a generates PDU 205, with an address of host 210b listed as its intended destination. PDU 205 may be a data unit of any type, such as a TCP/IP packet, UDP/IP packet, VxLAN Transit packet, and so forth. The host node 210a forwards the PDU 205 to the edge node 220.

Edge node 220 is the edge to the path telemetry domain 250. The path telemetry domain is a subset of nodes within the network 200, each of which may have one or more telemetry features enabled. Edge node 220 is specifically configured to function as an ingress edge telemetry node for network traffic, including PDU 205, that is entering the path telemetry domain 250. As such, edge node 220 includes logic for determining when certain telemetry triggering conditions are met. These conditions, also referred to as telemetry triggers, may include receiving one or more data units with certain attributes (e.g. being of a certain type, belonging to a specific traffic flow, belonging to a particular traffic flow class, having attributes with specified values, etc.), conditions related to the device state (e.g. buffer fill levels, queue sizes, delays, etc.), and/or random or probability-based sampling conditions. For instance, there may be a rule that indicates that every hundredth data unit from host 210a to host 210b will trigger telemetry collection. As another example, there may be a rule that whenever a buffer fill level exceeds a certain amount, telemetry collection should be triggered. The triggers may be fixed globally for path telemetry domain 250, or vary depending on the node. In an embodiment, the triggers may be set programmatically by administrative logic or a user.

When the telemetry triggering conditions are met, the edge node 220 may clone a PDU that was being processed when the triggering conditions were met (in this case PDU 205). The resulting cloned data unit, which may also be referred to as a telemetry data unit, may be a full copy of the original PDU, or a truncated version. For example, the clone 225 of PDU 205 may include only a certain number of bytes from PDU 205, only a first one or more cells from the PDU 205, or only the header of PDU 205, depending on the embodiment.

The edge node further inserts telemetry data, such as telemetry data 222, into the clone 225, such as in the payload of clone 225, or at the beginning or end thereof. Telemetry data 222 may include a variety of state information and metrics, depending on the embodiment. Examples of such data are described elsewhere herein. The edge node 220 may further insert other data into a clone, such as a marker in a special header field or at the beginning of the payload that indicates to other nodes in path telemetry domain 250 that the clone 225 is a telemetry data unit.

The edge node 220 utilizes its forwarding logic to forward both PDU 205 and clone 225 to a "next hop" on their path to host 210b, which as depicted is transit node 230b. Although there may be many other valid paths to host 210b (e.g. through transit node 230a), in an embodiment, clone 225 should be sent along the same path as PDU 205. Because clone 225 is a clone of PDU 205, this should occur automatically in most cases, as a result of clone 225 having certain header information that is the same as found in PDU 205. For instance, in an embodiment, the forwarding logic of edge node 220 uses a "five-tuple" combination of source address, source port, destination address, destination port, and PDU type to map a data unit to a flow (and corresponding egress port). The cloning process ensures that both PDU 205 and clone 225 have the same five-tuple flow identifier, and consequently are sent down the same path, as long as the network state remains the same between sending.

Transit node 230b receives both PDU 205 and its clone 225. Transit node 230b is configured to function as a transit telemetry node for the domain 250, in that it may update the telemetry data portion (e.g. modify existing or insert additional telemetry data) in telemetry data units that pass through it. For instance, the transit node 230b may insert its own state information and metrics into clone 225. The transit node 230b may also or instead calculate aggregate metrics based on the metrics it collects and the metrics already found in telemetry data 222, and replace those metrics with the calculated aggregate metrics. Transit node 230b may always update telemetry data 222 for any data unit that it recognizes as a telemetry data unit (e.g. through an inserted marker), or transit node 230b may update telemetry data 222 only when certain transit telemetry triggers are met.

Transit node 230b utilizes its forwarding logic to forward both PDU 205 and clone 225 to a "next hop" on their path to host 210b, which as depicted is edge node 240b. Edge node 240b is configured to function as an egress edge telemetry node within the path telemetry domain 250. As such, egress node 240b monitors for telemetry data units (e.g. by searching for inserted telemetry markers). When it receives a telemetry data unit, such as clone 225, the egress node 240b extracts the telemetry data therein and sends telemetry information 245 based thereon to a telemetry collector 260. Optionally, the telemetry information 245 may further be based on telemetry data generated by edge node 240b. In an embodiment, egress node 240b may function as an egress edge telemetry node for all telemetry data units that it detects, or just for those meeting certain triggering conditions or having a certain marker.

The telemetry information 245 may include some or all of the telemetry data 222, including updates from by any intervening transit nodes 230. In an embodiment, telemetry information 245 may be or include a report that summarizes such telemetry data 222. For instance, edge node 240 may send the telemetry data 222 to an internal processor configured to process the telemetry data 222 and generate a report based thereon. In an embodiment, edge node 240 may only send the telemetry information 245 when certain conditions are met, either within the telemetry data 222 itself, or related to the state of edge node 240b itself.

The telemetry collector 260 may be a separate device on the network 200, or logic implemented by a processor or other component on each edge node 240. In an embodiment, the telemetry collector 260 is configured to receive telemetry information from each edge node 220/240 in the path telemetry domain 250. In an embodiment, the telemetry collector 260 is internal to egress edge 240b, such as a processor coupled to a special internal port. However implemented, the telemetry collector 260 may perform any of a variety of functions with the telemetry information it collects, such as generating reports and analyses for an end user, generating notifications in response to observing certain conditions in the network 200, reconfiguring different devices on the network 200 when certain conditions occur, and so forth.

In an embodiment, the telemetry collector 260, or telemetry report generation logic at the egress node 240b, may correlate telemetry data from a telemetry data unit to the original data unit from which it was cloned. It may do so, for example, by matching identifying information from the header (e.g. a combination of addresses, a fragment identifier, and offset) of the telemetry data unit to the original data unit. The telemetry data may then be used for forensics or other analyses involving the original data unit.

In an embodiment, egress node 240b is configured to discard (drop) a telemetry data unit after extracting the telemetry data from a telemetry data unit. Hence clone 225 is not forwarded on to host 210b. However, forwarding logic within egress node 240b still resolves PDU 205 to host 201b, and sends PDU 205 out an egress port connected thereto.

FIG. 2 illustrates but one example of telemetry collection within a network. Other embodiments may include fewer, additional, and/or different components in varying arrangements. For example, the path telemetry domain 250 may include additional edge nodes 220/240 and transit nodes 230, each configured to function in similar manner to that described above. Moreover, there may be other nodes in between the transit nodes 230 and/or edge nodes 220/240 that do not function in the path telemetry domain. The path traversed by PDU 205 may further include some of these additional transit or other nodes. Likewise, there may be additional host nodes 210. There may also be additional nodes between some host nodes 210 and the edge nodes 220/240, which do not participate in the path telemetry domain 250.

While PDU 205 is specifically illustrated as being sent between host 210a and host 210b, similar techniques may be practiced for data units sent by any two nodes in a network, including both terminal nodes and intermediary nodes. In an embodiment, the data in PDU 205 may actually originate from outside of network 200, and/or be destined for a device that is outside of network 200. Host 210a and/or 210b may be a gateway, firewall, or other device that functions as a source or destination for the purpose of the traversal of PDU 205 through network 200.

The roles of the edge nodes may be reversed depending on the direction of a data unit. For instance, for a PDU 205 traversing the path telemetry domain 250 in the opposite direction, edge node 240b may function as an ingress edge telemetry node, while edge node 220 may function as an egress edge telemetry node.

In an embodiment, the path telemetry domain 250 may have different edge nodes and/or transit nodes depending on the type or flow of traffic, or even the current state of the various nodes. For instance, edge node 220 might not flag another PDU from host 210a for cloning at a different time, if the PDU is of a different type, or for a different traffic flow, or if the node 220 is in a different state. On the other hand, transit node 230a might receive this other PDU, and determine that telemetry triggering conditions have been met, and thus generate a telemetry data unit. Transit node 230a would thus be the ingress edge telemetry node for this PDU. Similarly, different nodes may function as transit nodes and/or edge nodes depending on any of the foregoing factors.

In an embodiment, a domain 250 may have more than one telemetry collector 260. Some or all of the edge nodes 240 may be configured to send telemetry information to different telemetry collectors 260. Each node 240 may be configured to send telemetry information to a specific telemetry collector 260. Or, a node 240 may be configured to determine the telemetry collector 260 to send telemetry information to, based on factors such as the data unit type of the original data unit, the destination of the original data unit, the specific telemetry data observed, and so forth. In an embodiment, each edge node 240 may send the same telemetry information to all telemetry collectors 260. In an embodiment, a node 240 may send different telemetry information derived from a same telemetry data unit to different telemetry collectors 260.

In an embodiment, a destination node, such as host 210b, may receive certain telemetry data units and may therefore also include logic for handling telemetry data units. The destination node may, for example, include logic for separating telemetry data units from regular data units so that they do not interfere with processing of the data units at an application layer. A destination node may further include egress edge telemetry logic for extracting and/or reporting telemetry data from a telemetry data unit.

The destination node may, for example, function as an egress edge telemetry node 240 within the telemetry domain 250. As another example, the telemetry data unit may bypass egress edge telemetry nodes 240, or egress edge telemetry nodes 240 may allow telemetry data units to pass through them to the destination. For instance, in the latter case, an egress edge telemetry node 240 may not send telemetry report data to the telemetry collector 260 under certain conditions, but instead opt to let the telemetry data unit pass through to the destination. In yet other embodiments, egress edge telemetry nodes 240 are simply omitted, and the destination node must be prepared to handle telemetry data units.

2.5. Example Device Telemetry Components

Figure 3:
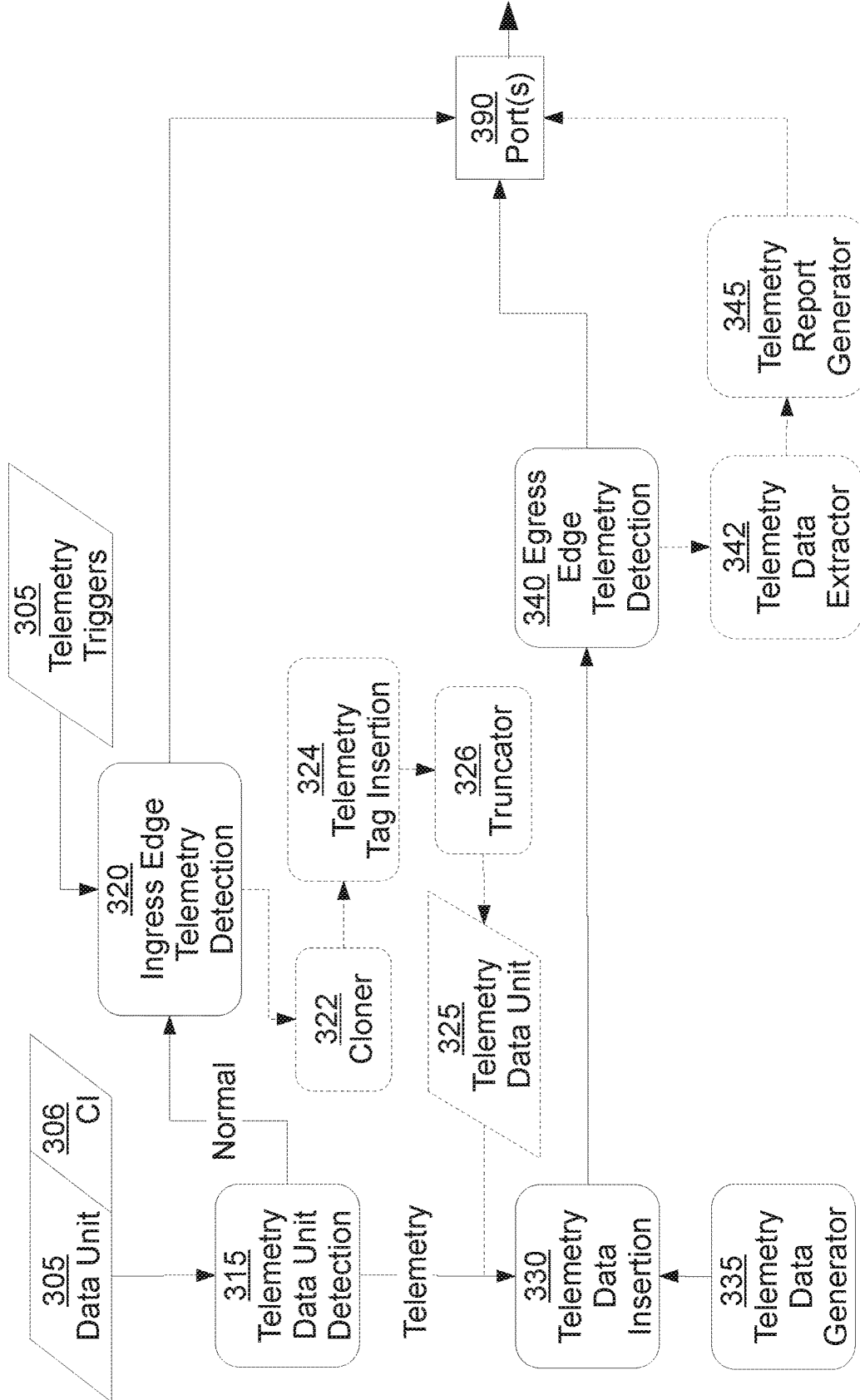
FIG. 3 is an illustrative view of various components of an example telemetry subsystem for a network device.

FIG. 3 is an illustrative view of various components of an example telemetry subsystem 300 for a network device, according to an embodiment. Subsystem 300 may be a subsystem within a switch or other network device, as described elsewhere herein, or any other computing device. In an embodiment, the various components of subsystem 300 described below are hardware-based logic units within one or more application-specific integrated circuits (ASICs), field programmable gate arrays (FPGAs), or other integrated circuit(s). In other embodiments, some or all of the components may be software-based logic implemented by one or more processors executing instructions stored in one or more computer-readable media.

Subsystem 300 may be utilized in any device that generates, updates, or extracts data from telemetry data units. For example, some or all of edge nodes 220/240 and transit nodes 230 may include components from subsystem 300. In other embodiments, however, a telemetry path domain 250 may be practiced without the specific details of subsystem 300, while subsystem 300 may be deployed in devices other than those depicted in FIG. 2.

Subsystem 300 receives a data unit 305, such as PDU 205 or any other data unit. In an embodiment, the data unit 305 is accompanied by control information 306, either within the data unit 305 itself, or as sideband information. The control information 306 may include various metadata and/or instructions for handling the data unit 305. Depending on the implementation, the data unit 305 may be received from a variety of source components within the implementing device. For example, the data unit 305 may have been recently dequeued from an ingress or egress queue. Or, the data unit 305 may be received from a packet processor.

Subsystem 300 has a telemetry data unit detection component 315 configured to determine whether the data unit 305 is a normal data unit, or a telemetry data unit generated by a node upstream in the path of data unit 305. For instance, the telemetry data unit detection component 315 may scan the header or first bytes of the payload of data unit 305 for a certain marker. The marker may be fixed for all data units, or specific to the data unit type. If data unit 305 is determined not to be a telemetry data unit, it is forwarded to ingress edge telemetry detection component 320. Otherwise, the ingress edge telemetry detection component 320 should be bypassed, so as to avoid unnecessarily cloning the telemetry data unit, and the data unit 305 is sent to telemetry data insertion component 330.

Ingress edge telemetry detection logic 320 evaluates the data unit and/or device state information against one or more telemetry triggers 328, such as described in other sections. If those telemetry triggers are met, a cloner 322 generates a clone of the data unit 305, such as clone 225. Telemetry tag insertion component 324 inserts the telemetry marker that the telemetry data unit detection component 315 was searching for into the clone. For instance, the telemetry marker may take the form of unused fields of a standard data unit header or select modifications to the standard data unit header. Truncator 326 truncates the clone. The clone may be truncated to a certain length (e.g. a number of bytes or cells), or everything but the header may be removed. In an embodiment, the header is retained, as well as a certain number of bytes from the payload. The order of truncator 326 and tag insertion component 324 may be reversed in some embodiments. Moreover, rather than featuring a dedicated truncator 326, cloner 322 may simply only clone the desired part of the data unit 305.

In an embodiment, ingress edge telemetry detection component 320 determines whether there is already a telemetry data unit that exists for a data unit 305 (e.g. generated by a previous node) before cloning the data unit 305. For example, ingress processing logic may add control information 306 to data unit 305 when it detects a telemetry data unit that was cloned from the data unit 305 within a certain timespan of receiving the data unit 305. A data unit 305 may include a pseudo-unique identifier (e.g. a fragment identifier and offset in its header), and the fact that two data units 305 with the same identifier are received in that time span may be interpreted as an indication that the data unit 305 has already been cloned. The ingress edge telemetry detection component 320 may therefore avoid generating another clone.

The result of components 322-326 is that a telemetry data unit 325 is generated based on the data unit 305. The telemetry data unit 325 is either sent to the telemetry data insertion component 330 directly, or by reintroducing it into the data unit processing pipeline, so that it will be received at telemetry data unit detection component 315 in the same manner as data unit 305. The data unit 305, meanwhile, may continue to the egress port(s) 390 to which it should be forwarded, either directly or via one or more intermediate downstream logic components, depending on the embodiment.

Telemetry data insertion component 330 is configured to, if it receives a telemetry data unit (e.g. data unit 305 if it is a telemetry data unit, or a newly generated telemetry data unit 325), insert and/or modify telemetry data within the telemetry data unit. Subsystem 300 may include a telemetry data generator 335 that generates telemetry data based upon the state of the implementing device and/or metrics related to the implementing device's processing of data unit 305 or telemetry data unit 325. For instance, control information 306 may include identifiers of ports or queues that data unit 305 has traversed or will traverse. Control information 306 might further include statistics related to the processing of data unit 305 or telemetry data unit 325 in such queues. Or, such metrics may be obtained from other sources within the implementing device. Further examples of such telemetry data are described in other sections.

In an embodiment, telemetry data insertion component 330 may be configured to only insert telemetry data when certain conditions are met. For example, telemetry data insertion component 330 may evaluate telemetry triggers similar to telemetry triggers 328 to determine whether to insert telemetry data.

Telemetry data insertion component 330 sends the telemetry data unit to egress edge telemetry detection component 340, which is configured to detect whether the telemetry data unit has reached an extraction point. For those telemetry data units that have reached an extraction point, the telemetry data unit is diverted to a telemetry extraction component 342. All other telemetry data units may be forwarded on to their destination port(s) 390, as with data units 305.

Depending on the embodiment, and on which node is implementing subsystem 300, egress edge telemetry detection component 340 may be configured to send all, some, or none of the telemetry data units that it receives to telemetry extractor 342. For instance, if implemented by a node that has been configured only as a transit telemetry node, telemetry detection component 340 may be essentially inactive, in that all telemetry data units pass through it and on to port(s) 390. In an embodiment, egress edge telemetry detection component 340 may be configured to divert all telemetry data units, or all telemetry data units of a certain type, to the telemetry extractor 342. In an embodiment, egress edge telemetry detection component 340 may be configured to divert telemetry data units to telemetry data extractor 342 only if certain telemetry conditions are met, similar to telemetry triggers 328.

In an embodiment, egress edge telemetry detection component 340 may divert telemetry data units to telemetry extractor 342 if the telemetry data units are greater than a certain size, or contain telemetry data from more than a certain number of nodes. For example, it may be desirable to avoid a telemetry data unit growing too large. Optionally, in such embodiments, if the implementing device is configured as a transit node, egress edge telemetry detection component 340 may trigger re-cloning of the telemetry data unit without the extracted telemetry data. The re-cloned data unit may be sent out port(s) 390, thereby allowing an empty telemetry data unit to continue along the path for telemetry data collection at subsequent nodes.

The telemetry extractor 342 extracts telemetry data from the telemetry data unit. In some embodiments, it may send the telemetry data directly to a telemetry collector. In other embodiments, telemetry report generator 345 may generate telemetry report data from the raw telemetry data that was extracted from the telemetry data. For instance, the telemetry report data may include aggregate metrics such as a total or average delay or queue size, a total number of nodes in the path of the telemetry data unit, categorizations of metrics (e.g. high delay, low delay, etc.), and so forth. In an embodiment, the telemetry report data may filter the telemetry data to include only data from nodes with unexpected or outlier values. For instance, the telemetry report data may preserve state data from any nodes where the telemetry data unit experienced a delay above a certain value, but omit state data from other nodes.

In an embodiment, telemetry report generator 345 may analyze the extracted telemetry data, and only send telemetry report data if certain conditions are met. For example, the telemetry report generator 345 may send the telemetry report data only if a certain amount of delay was encountered. In essence, the telemetry report generator 345 may provide filtering for the telemetry collector, thereby reducing the bandwidth of telemetry traffic on the network.

Depending on the embodiment, the telemetry collector may be reachable via one of the port(s) 390 (e.g. when it is a separate node on the network), via a separate link, or via an internal port (e.g. for consumption by a local processor).

Components of subsystem 300 may be deployed in varying locations within a device. For instance, with respect to the network devices depicted at the end of this disclosure, subsystem 300 may be deployed partially or entirely within or after an egress packet processor. Or, detection components 315, 320, and/or 340 may be deployed in an ingress arbiter or packet processor, which then mark the data units for telemetry generation and collection (e.g. using control information 306) by a downstream traffic manager or egress packet processor.

In an embodiment, cloner 322 is implemented at a transmit buffer for transmitting data units that have already been processed by an egress packet processor. The cloner 322 may, for instance, cause multiple copies of the data unit 305 to be transmitted one after another, or close to one after another, with one of the copies including telemetry marking data and/or telemetry data inserted by the telemetry data insertion component 330. Or, the cloner 322 may cause the data unit 305 to be copied from the transmit buffer to an internal port that recirculates back to a traffic manager, which then causes the clone (that is, the telemetry data unit 325) to be enqueued in the same egress queue as the data unit 305 had been. Telemetry data insertion component 330 may then cause telemetry data to be inserted in the telemetry data unit 325 when the telemetry data unit 325 is dequeued from that egress queue, and the telemetry data unit 325 may eventually be sent out the same port 390 as the original data unit 305.

FIG. 3 illustrates but one arrangement of components for implementing telemetry collection in a network or other computing device. Other embodiments may include fewer or additional components in varying arrangements, and the division of work between components may likewise vary. For instance, in an embodiment, egress edge telemetry detection 340 may be deployed before telemetry data insertion component 330 and/or ingress edge telemetry detection component 320. In an embodiment, not all nodes in a network need include all of the components of subsystem 300. For instance, a transit node may omit logic for edge detection components 320 or 340. As another example, a node may have an ingress edge telemetry detection component 320, but no egress edge telemetry detection component 340, or vice versa. In yet another embodiment, components of subsystem 300 may be activated or deactivated depending on the function of a node. For instance, in a transit node, ingress edge telemetry detection component 320 may be disabled.

In an embodiment, the destination of a data unit 305 may include egress edge telemetry detection logic 340, telemetry data extractor 342, and/or telemetry report generator 345. In such a device, other components of subsystem 330 may be omitted, and of course the data unit 305 would not continue on to port 390 for further forwarding, since the destination will have been reached.

In an embodiment, telemetry data insertion component may be configured to replace a set of raw telemetry data from a set of two or more nodes with a single entry of telemetry data that comprises aggregate statistics for all of the nodes in the set. Whenever a telemetry data unit has telemetry data from more than a certain number of nodes, the data from a most recent set of nodes may be analyzed, summarized, and inserted in place of the original data from those nodes.

2.6. Example Telemetry Data

In an embodiment, the telemetry data may include an identifier of the edge node 220. In an embodiment, the telemetry data may include various state data for the node. This may include individual statistics for individual ports and/or port groups within the node, such as port loading data, per-port buffer fill levels (e.g. an amount of buffer space occupied by data units assigned to the port, a number of data units assigned to the port, etc.), per-port queue lengths (e.g. number of data units currently enqueued in a queue, average number of data units enqueued for all queues assigned to the port, etc.), per-port queue delays (e.g. approximate measure of time or clock cycles that a data unit sits in the queue before being dequeued, on average), and so forth. This may further include aggregate statistics for the entire node, such as an overall buffer fill level, an overall average queue length, an overall average queue delay, an overall average delay between a time when a data unit arrives at a node and a time when the data unit leaves, and so forth.

In an embodiment, the telemetry data may also or instead include data that is more specific to the telemetry data unit and/or the original data unit from which the telemetry data unit was cloned. For instance, rather than including metrics for each port or port group in the node, the telemetry data may include only metrics that are related to a port or port group associated with the data unit, such an ingress port over which the data unit arrived and an egress port to which the data unit is to be forwarded.

The telemetry data specific to the data unit may further include, for instance, an identifier of an ingress port over which the node received the data unit and/or an egress port to which the node resolved the data unit for forwarding. This data may further include a timestamp associated with an ingress event for the data unit (such as when it was received at an ingress arbiter or packet processor, when it was enqueued in an ingress or egress queue, etc.), and/or a timestamp associated with an egress event for the data unit (such as dequeuing the data unit from an egress queue, transferring to a transmit buffer, etc.). In an embodiment, rather than, or in addition to, including such timestamps, the telemetry data may include a total delay, which is a difference between two such timestamps.

The telemetry data may further include data and/or statistics related to a queue in which the data unit was enqueued. For instance, the telemetry data may include an identifier of an egress queue in which the data was enqueued. The telemetry data may further include statistics specific to the identified queue, such as a length of the queue at a time when the data unit was enqueued and/or dequeued (or the most recently determined length as of such a time), an actual or approximate delay experienced by the data unit in the queue, an actual or approximate amount of buffer space utilized by data units within that queue, and so forth.

In an embodiment, the telemetry data may also or instead include metrics based on the foregoing, such as running averages, deviations, or functions of such measures over time. In an embodiment, instead of including specific measures, the measures may be "quantized," in that they are categorized according to a value range in which they fall. For instance, instead of specifying an exact number of seconds that a data unit was delayed, the telemetry data may simply specify that the delay was "high" or "low," depending on which range the delay falls in. Likewise, instead of specifying an actual amount of buffer space consumed, the telemetry data may simply indicate whether the calculated amount of space is considered to fall in a "congested" or "uncongested" range.

The foregoing statistics data may be determined in a variety of manners, depending on the embodiment. For example, different components of a node, such as an ingress arbiter or traffic manager, may include logic for calculating the statistics, which they then embed in control information or other metadata that accompanies the data unit through the data unit processing pipeline on to the telemetry data insertion component 330. In an embodiment, a separate subsystem may exist for tracking and maintaining some or all of the foregoing data, and the telemetry data insertion component 330 may lookup the data using that subsystem when needed.

In an embodiment, any data unit specific statistics in the telemetry data may be relative to the telemetry data unit. In another embodiment, the telemetry data insertion component may be capable of locating data unit specific statistics for the original data unit using the telemetry data unit, and hence the data unit specific statistics may be specific to the original data unit. In yet other embodiments, both types of statistics may be included.

In an embodiment, the telemetry report data sent to a telemetry collector may include some or all of the foregoing telemetry data for each node in the telemetry data unit's path. Or, the telemetry report data may include some or all of the foregoing telemetry data only for one or more nodes of interest in the path, such as for any nodes at which a delay measure (queue delay, total delay, etc) or other measure falls in a "high" or other undesirable range. In an embodiment, telemetry report data may additionally or instead include any type of data derived from the foregoing, including averages, sums, and/or other functions across multiple nodes, as well as quantized versions of the foregoing. As non-limiting examples, the telemetry report data might include a sum queue delay experienced by the telemetry data unit across all nodes in the path, a sum total delay, an average queue size, a general characterization of the path as being congested or normal based on the observed metrics, and so forth.

The telemetry data described in this section are non-limiting examples of telemetry data that may be inserted in a telemetry data unit. A variety of other types of statistics may be tracked and recorded in a telemetry data unit.

2.7. Miscellaneous

In an embodiment, a node may elect to drop a telemetry data unit under certain conditions, while allowing the original data unit to carry on its path. For instance, a node may be configured to drop all telemetry traffic (that is, all telemetry data units), once it reaches a certain level of congestion, as indicated by one or more metrics such as queue size, queue length, or buffer fill level. As another example, a node may be configured to not enqueue telemetry data units in a queue when the queue is over a certain length, has a certain measure of delay, or is any other undesirable state.

In an embodiment, if the volume of telemetry traffic exceeds a threshold (e.g. above a certain number of telemetry data units enqueued or transmitted in a period of time, more than a certain amount of buffer space occupied by telemetry data units, etc.), a node may stop generating telemetry data units and/or inserting telemetry data in existing telemetry data units. Optionally, the node may further drop new telemetry data units it receives and/or certain existing telemetry data units that it enqueues or dequeues.

In an embodiment, a network may have more than one path telemetry domain, which may be overlapping or non-overlapping. Each domain may have its own edge nodes, transit nodes, telemetry collector(s), telemetry triggers, telemetry marker, and so forth.

In an embodiment, ingress edge telemetry functionality may be enabled or disabled in a node on a per-port basis. Likewise, egress edge telemetry functionality may be enabled or disabled in a node on a per-port basis. Similarly, the telemetry triggers for a node may vary depending on the port. In such embodiments, transit telemetry functionality may be enabled or disabled globally, or also on a per-port basis.

In an embodiment, when a telemetry data unit carries more than a maximum threshold amount of data, a transit telemetry node may condense that data into summary data before passing the telemetry data unit on, so as to make room for additional telemetry data. Or, summary data may be generated for each of one or more "legs" of the path traversed by the telemetry data unit.

As already explained, in an embodiment, telemetry information may be sent to multiple telemetry collectors. In an embodiment, one of these collectors may be the destination endpoint for the original data unit. The telemetry information may be sent to the endpoint, or the telemetry data unit itself may simply be forwarded on to the endpoint. In an embodiment, a collector may be the original source node. The telemetry information and/or telemetry data unit may be forwarded ("reflected") along a reverse path back to the source node.

In an embodiment, rather than waiting for a data unit to arrive at an ingress edge telemetry node, a source node (e.g. host 210*a*) may include logic for cloning a data unit before sending that data unit. For instance, a source node may include logic similar to ingress edge telemetry detection component 320 for evaluating when telemetry triggers are met. When the triggers are met, logic similar to that of components 322-326 may generate a telemetry data unit and inject the telemetry data unit into the data unit processing pipeline. The source node may or may not insert telemetry data into the telemetry data unit before forwarding the telemetry data unit on. In an embodiment, using this technique, a source node may be capable of transmitting a telemetry data unit immediately before or after the original data unit, ensuring that the metrics collected for the telemetry data unit remain highly relevant to the original data unit.

3.0. Functional Overview

Figure 4:
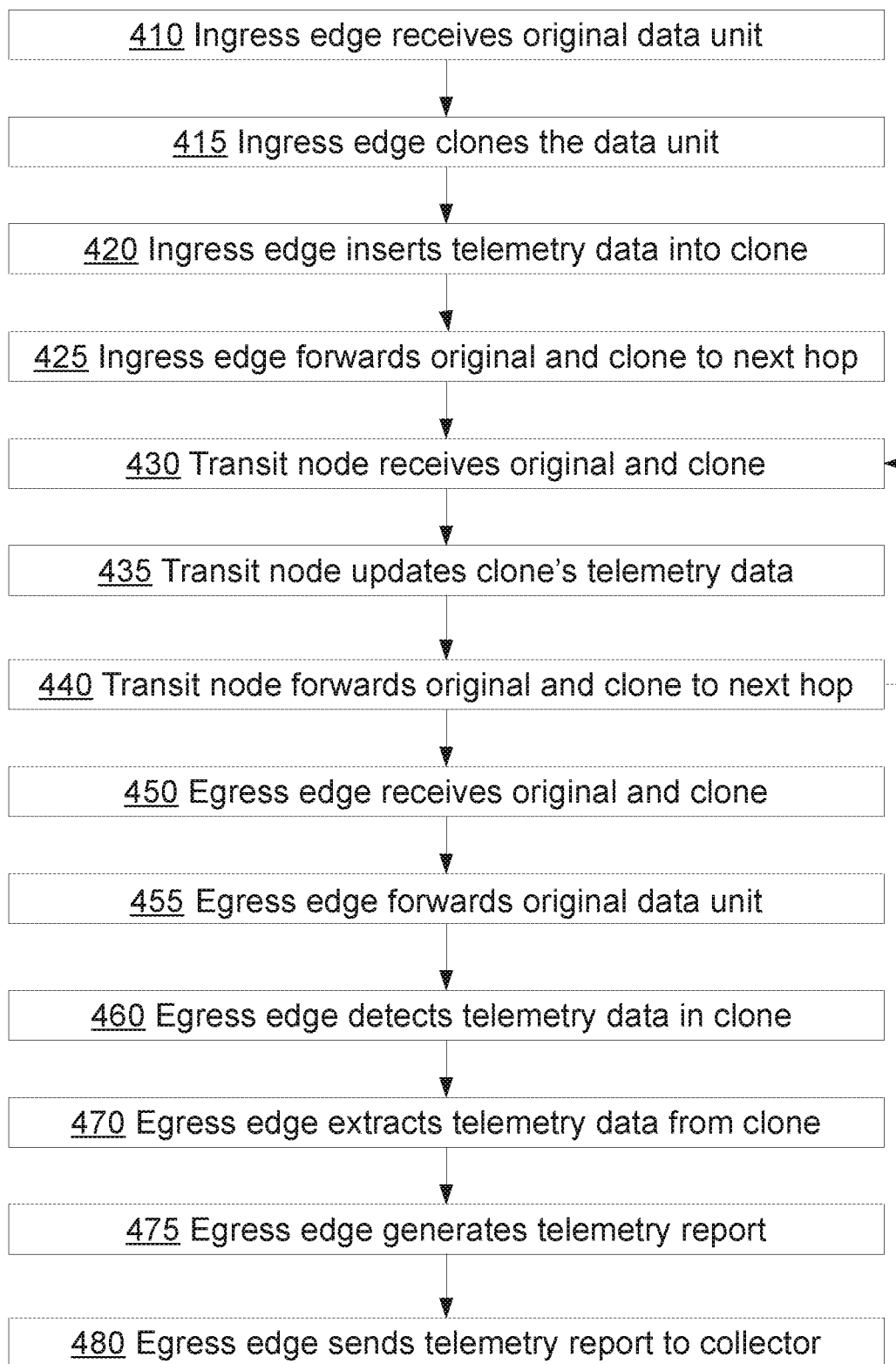
FIG. 4 illustrates a flow for generating and collecting telemetry information for a data unit as it traverses a network.

FIG. 4 illustrates a flow 400 for generating and collecting telemetry information for a data unit as it traverses a network, according to an embodiment. Flow 400 may be performed within a network of switches and/or other devices described in other sections. In an embodiment, flow 400 may be performed by nodes such as nodes 220, 230, and 240 within network 200, using components such as illustrated with respect to subsystem 300. However, flow 400 may similarly be performed in other networks of devices using other arrangements of components. Moreover, telemetry domain 250 and subsystem 300 need not be limited specifically to performance of the example flow described below.

In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

Block 410 comprises receiving a data unit at a node that has been configured as an ingress edge telemetry node. The node may have been configured as an ingress edge telemetry node for all network traffic it receives, or only for certain types of traffic, such as data units assigned to a flow or having other attributes similar to the data unit. In an embodiment, the node compares the data unit, or data unit metadata, to telemetry triggers to determine whether the node is an ingress edge telemetry node for the data unit.

Block 415 comprises the ingress edge telemetry node cloning the data unit. In an embodiment, the node performs block 415 for all data units that the node receives. In an embodiment, the node performs block 415 only for a subset of data units it receives. For instance, the node may perform 415 only a certain percentage of the time, or at a certain probability level. Of course, if the node determines not to perform block 415 for a data unit, flow 400 does not continue for that data unit.

Cloning a data unit may involve such steps as, without limitation, copying the data unit from a location in a buffer to a location in another buffer, retransmitting the data unit from a transmit buffer, and/or re-enqueuing a buffered data unit in a queue so that it is processed multiple times without there necessarily being multiple physical copies of the data unit. The cloned data unit, which is known as a telemetry data unit, may be a full clone of the original data unit, or may comprise only a header or other portion of the original data unit, depending on the embodiment.

Block 420 comprises the ingress edge telemetry node inserting telemetry data into the telemetry data unit. The telemetry data may be any suitable set of metadata, state data, statistics, metrics, etc. Example telemetry data is described in other sections. In an embodiment, the telemetry data is inserted in or as the payload of the telemetry data unit, thereby replacing payload data from the original data unit. In an embodiment, the telemetry data may be preceded by a telemetry instructions header, including a telemetry marker identifying the data unit as carrying telemetry data, an identifier of the original data unit, instructions for downstream components or nodes as to how and what telemetry data should be inserted, and/or other suitable data.

Block 425 comprises the ingress edge telemetry node forwarding the original data unit and its clone (the telemetry data unit) to a next hop in their path to their intended destination. For instance, the forwarding logic in the ingress edge telemetry node may compare a destination address or other information in the headers of the data unit and the telemetry data unit to entries in a forwarding table. Based thereon, the node may determine an egress port by which the data unit and telemetry data unit should be forwarded to reach the next hop in their path. The node may then transmit the original data unit and the telemetry data unit out this port. Since the original data unit and the telemetry data unit include the same header, both will typically be forwarded to the same next hop.

Note that, in some embodiments, the data unit and the telemetry data unit may pass separately through the forwarding logic of the node, and hence these steps may be repeated separately for the node and its clone, though typically in close temporal proximity. Moreover, certain steps of this process may, in some embodiments, be performed prior to the telemetry data being inserted in the telemetry data unit in block 420, as the telemetry data unit might need to pass through an egress queue associated with the identified egress port before some of the telemetry data can be collected.

Block 430 comprises receiving the data unit and the telemetry data unit at a node that has been configured as a transit telemetry node. In an embodiment, similar to the ingress edge telemetry node, the node may be configured as a telemetry transit node for some or all telemetry data units that it receives. In an embodiment, the data unit and telemetry data unit may pass through one or more non-telemetry nodes on their way to the transit node. In another embodiment, the data unit and telemetry data unit arrive directly from the ingress edge telemetry node (or another transit telemetry node, in the case that flow 400 has looped back to block 430).

Block 435 comprises the transit node updating the telemetry data unit, by inserting its own telemetry data into the telemetry data unit, and/or by modifying aggregate telemetry data to reflect statistics at the transit telemetry node. The transit telemetry node may perform block 435 in response to recognizing the telemetry data unit as a telemetry data unit by, for instance, a telemetry marker or other information in the telemetry data unit. The telemetry data may include a variety of telemetry data generated by the transit telemetry node, as described in other sections.

Block 440 comprises forwarding the original data unit and the telemetry data unit to their next hop on their path to the destination address, using forwarding logic as described with respect to block 430. From here, flow 400 may return to block 430, in which case the original data unit and the telemetry data unit are received by another transit telemetry node. The original data unit and the telemetry data unit may be received and processed by any number of telemetry data units over the course of flow 400.

Eventually, however, flow 400 proceeds to block 450. Block 450 comprises receiving the original data unit and the telemetry data unit at a node that has been configured as an egress edge telemetry node. Again, the node may be configured as an egress edge telemetry node for some or all telemetry data units that it receives. For instance, the node may be an egress edge telemetry node for telemetry data units destined to one egress port, but not another. Or, the node may be an egress edge telemetry node for telemetry data units that meet certain telemetry triggers.

Block 455 comprises the egress edge telemetry node forwarding the original data unit towards its intended destination, as it normally would. The destination may, in some cases, be a next hop. In other cases, there may be one or more additional hops before the original data unit will reach its intended destination. Block 455 may be performed with forwarding logic in similar manner to block 435.

However, instead of also forwarding the telemetry data unit to the destination specified in the telemetry data unit header, in block 460, the egress edge telemetry node detects telemetry data in the telemetry data unit. The node may scan for actual telemetry data, or the existence of such data may be inferred from a telemetry marker or other identifying information in the telemetry data unit.

Responsive to detecting the telemetry data, the egress edge telemetry node extracts the telemetry data in block 470. In an embodiment, this may comprise, for instance, removing the payload from the telemetry data unit, and dropping the telemetry data unit for forwarding purposes. In yet other embodiments, the telemetry data unit need not necessarily be dropped.

Block 475 comprises generating telemetry report data at the egress edge telemetry node, based on the extracted telemetry data. This may involve various calculations, processing, and analysis steps by a processor or other component of the egress edge telemetry node, such as described in other sections. In an embodiment, this may be a trivial step, in that the telemetry report data is the extracted telemetry data.

In an embodiment, the telemetry report data may optionally include or be based on telemetry data generated by the egress edge telemetry node. In another embodiment, flow 400 may include a step of the egress edge node inserting its own telemetry data into the telemetry data unit before the telemetry data is extracted from the telemetry data unit in block 460.

Block 480 comprises sending the telemetry report data to a telemetry collector. The telemetry report data may be sent, for instance, out over the network as one or more packets to a centralized telemetry collector. Or, the node may have its own internal telemetry collector to which the telemetry report data may be sent.

Flow 400 is but one example method flow for generating and collecting telemetry data. Other flows may include fewer, additional, or different steps in varying arrangements. For instance, in an embodiment, the original data unit and telemetry data unit may not necessarily pass through any transit telemetry node, and thus blocks 430-440 may be skipped. As another example, the telemetry data unit may be generated at the original source that sent the original data unit, and hence flow 400 may begin at block 430.

In an embodiment, block 420 may be omitted, in that an ingress edge telemetry node may be merely responsible for creating a clone, and telemetry data is not inserted until the clone reaches a transit node. In yet another embodiment, insertion of telemetry data (e.g. block 435) at any hop in the path of the data unit may be optional, depending on the configuration of the hop and/or telemetry triggers at the hop. In an embodiment, flow 400 may include a step of deciding whether to send the telemetry report data to the telemetry collector, based on the telemetry data and/or other factors, as described elsewhere herein.

Flow 400 may be performed for multiple data units concurrently as they pass through a path telemetry domain. Some data units may be following different paths, including a reverse path. Consequently, different nodes may act in different capacities for different data units, depending on the paths and/or other attributes of those data units. For instance, the ingress edge telemetry node of blocks 410-425 may be (but is not necessarily) an egress edge telemetry node for another data unit that is being returned from the destination of the original data unit back to the sender of the original data unit.

In an embodiment the egress edge telemetry node is not at the edge of the telemetry domain, meaning that the original data unit may pass through additional telemetry transit nodes. The egress edge telemetry node may have decided to act as an egress edge telemetry node instead of a transit node, however, based on the size or other characteristics of the telemetry data already in the original data unit. In such an embodiment, the original data unit may again be cloned, returning flow 400 back to block 415, and additional telemetry data may be collected for the original data unit.

In an embodiment, the destination of the data unit may function as the egress edge telemetry node, in which case block 455 may be omitted.

4.0. Example Embodiments

Examples of some embodiments are represented, without limitation, as follows:

A system comprising a plurality of network devices, the plurality of devices comprising: a plurality of communication interfaces configured to receive data units; packet-switching logic configured to identify destinations for the data units and forward the data units out specific communication interfaces, of the communication interfaces, that are mapped to those destinations; wherein the network devices include: a first network device configured to: when one or more telemetry trigger conditions occur, generate a telemetry data unit by inserting telemetry data in an at least partial clone of a data unit received by the first network device; forward the data unit and the telemetry data unit along a same path to a destination based on same header data in both the data unit and the telemetry data unit; a second network device configured to: receive the data unit and the telemetry data unit; extract the telemetry data from the telemetry data unit; send telemetry report data derived from the telemetry data unit to a telemetry collector.

In an embodiment, the network devices further include: one or more transit network devices, each device of the one or more transit devices configured to: receive the data unit and the telemetry data unit; update the telemetry data in the telemetry data unit based on additional telemetry data collected at the device; continue forwarding the data unit and the telemetry data unit along the path to the destination.

In an embodiment, the plurality of network devices form a telemetry domain within a data center, the telemetry domain including a plurality of edge devices that are configured in the same manner as the first device and the second device, wherein the one or more transit network devices include a plurality of transit devices that interconnect the edge devices.

In an embodiment, the system further comprises the telemetry collector, the telemetry collector being a separate device in the telemetry domain to which a plurality of the edge devices send telemetry information, including the telemetry report data, derived from telemetry data units.

In an embodiment, the telemetry data includes one or more of: an identifier of the first device, an ingress port identifier, an egress port identifier, an ingress timestamp, an egress timestamp, a queue identifier, a queue length, a congestion measure, a buffer fill measure, and/or a delay measure.

In an embodiment, the telemetry report data includes an aggregate delay measured for the telemetry data unit in the path from the first device to the second device.

In an embodiment, the second network device is further configured to continue forwarding the data unit along the path to the destination.

In an embodiment, the second network device is the destination.

According to an embodiment, a method comprises: receiving a data unit at a network device via a first communication link; receiving a telemetry data unit at the network device via the first communication link, the telemetry data unit being an at least partial clone of the data unit, including same header data as the data unit; at the network device, extracting, from the telemetry data unit, telemetry data generated by one or more other network devices in a path traversed by both the data unit and the telemetry data unit; sending, by the network device, telemetry report data derived from the telemetry data to a telemetry collector.

In an embodiment, the first network device is a switch, the one or more network devices in the path include one or more additional switches, and the data unit is an Internet Protocol packet.

In an embodiment, the one or more other network devices include at least two network devices.

In an embodiment, the same header data includes at least a same source address field, a same destination address field, a same source port field, a same destination port field, and a same type field in the data unit headers of the data unit and the telemetry data unit.

In an embodiment, the same header data is the entire header of the data unit and of the telemetry data unit.

In an embodiment, the network device is an egress edge telemetry node, wherein the one or more other network devices include an ingress edge telemetry node, the method further comprising: receiving the data unit at the ingress edge telemetry node; generating the telemetry data unit at the ingress edge telemetry node by at least partially cloning the data unit; at the ingress edge telemetry node, inserting first telemetry data of the telemetry data in the telemetry data unit; and based on same destination address information of the header data in the data unit and the telemetry data unit, forwarding the data unit and the telemetry data unit from the ingress edge telemetry node to a next network device in the path.

In an embodiment, the method comprises generating the telemetry data unit at the ingress edge telemetry node is responsive to determining that one or more telemetry triggering conditions have been met at a time that the ingress edge telemetry node is processing the data unit.

In an embodiment, the one or more other network devices include a transit telemetry node, and the method further comprises: receiving the data unit and the telemetry data unit at the transit telemetry node; at the transit telemetry node, inserting second telemetry data of the telemetry data in the telemetry data unit; based on same destination address information of the header data in the data unit and the telemetry data unit, forwarding the data unit and the telemetry data unit from the ingress edge telemetry node to a further hop in the path.

In an embodiment, the method further comprises the ingress edge telemetry data unit inserting a telemetry marker in the telemetry data unit, and the egress edge telemetry data unit determining that the telemetry data unit comprises the telemetry data based on detecting the telemetry marker in the telemetry data unit.

In an embodiment, the method further comprises: at least partially cloning the data unit from a buffer of a data unit processing pipeline of the ingress edge telemetry node, before forwarding the data unit to the next network device; injecting the telemetry data unit into the data unit processing pipeline of the ingress edge telemetry node for forwarding to the next network device.

In an embodiment, injecting the telemetry data unit into the data unit processing pipeline occurs prior to the data unit being forwarded to the next network device.

In an embodiment, the method further comprises: enqueuing the data unit in an egress queue of the data unit processing pipeline; wherein injecting the telemetry data unit into the data unit processing pipeline comprises forwarding the telemetry data unit to a traffic manager of the data unit processing pipeline via an internal port for enqueuing within the same egress queue as the data unit.

In an embodiment, for at least a first device of the one or more network devices in the path, the telemetry data includes one or more of: an identifier of the first device, an ingress port identifier, an egress port identifier, an ingress timestamp, an egress timestamp, a queue identifier, a queue length, a congestion measure, a buffer fill measure, and/or a delay measure.

In an embodiment, the method further comprises forwarding the data unit out a second communication link of the network device, the second communication link mapped to a destination indicated by the header data in the data unit; the network device discarding the telemetry data unit without forwarding the telemetry data unit out the second communication link.

In an embodiment, the network device is a destination device indicated by the header data in the data unit.

In an embodiment, the telemetry report data includes an aggregate delay measured for the telemetry data unit along the path.

In an embodiment, one or more non-transitory computer-readable media store instructions that, when executed by one or more computing devices, cause performance of the foregoing.

In an embodiment, a network apparatus comprises: a plurality of communication interfaces; ingress edge telemetry logic configured to generate a first telemetry data unit by: at least partially cloning a first data unit received via a first interface of the communication interfaces, and inserting telemetry marking data therein; packet-switching logic configured to forward the first data unit and the first telemetry data unit out a second interface of the communication interfaces, based on first header data found in both the data unit and the telemetry data unit; egress edge telemetry logic configured to: detect a second telemetry data unit that was received via a third interface of the communication interfaces, the second telemetry data unit also including the telemetry marking data, the second telemetry data unit being an at least partial clone of a second data unit received via the third interface; extract, from the second telemetry data unit, telemetry data generated by one or more other network devices in a path traversed by both the second data unit and the second telemetry data unit; send telemetry report data derived from the telemetry data to a telemetry collector.

In an embodiment, the packet-switching logic is further configured to forward the second data unit out a fourth interface of the communication interfaces, based on second header data found in both the second data unit and the second telemetry data unit; wherein the egress edge telemetry logic is configured discard the second telemetry data unit before the packet-switching logic can forward the second telemetry data unit.

In an embodiment, the second interface and the third interface are a same interface, wherein the first interface and the fourth interface are another same interface.

In an embodiment, the ingress edge telemetry logic is configured to generate the first telemetry data unit responsive to determining that one or more telemetry triggering conditions have been met at a time that the packet-switching logic is processing the first data unit.

In an embodiment, the apparatus further comprises telemetry insertion logic configured to: detect when a data unit being processed by the packet-switching logic is a telemetry data unit, based on telemetry marking data being found therein; update a telemetry data portion of the telemetry data unit based on telemetry data generated by the network apparatus.

In an embodiment, the packet-switching logic includes a data unit processing pipeline, the data unit processing pipeline including one or more buffers that store data units prior to the data units being forwarded out interfaces coupled to the data unit processing pipeline, and the ingress edge telemetry logic is configured to: perform said cloning from the one or more buffers before the first data unit is forwarded out the second interface; inject the telemetry data unit into the data unit processing pipeline for forwarding.

In an embodiment, for at least a first device of the one or more network devices in the path, the telemetry data includes one or more of: an identifier of the first device, an ingress port identifier, an egress port identifier, an ingress timestamp, an egress timestamp, a queue identifier, a queue length, a congestion measure, a buffer fill measure, and/or a delay measure.

Yet other example embodiments are described in other sections herein.

5.0. Example Network Device

This section describes, in greater detail, example network devices in which the components and techniques described herein may be implemented. However, the techniques described herein are also useful in switches and contexts other than those described in this section.

Figure 5:
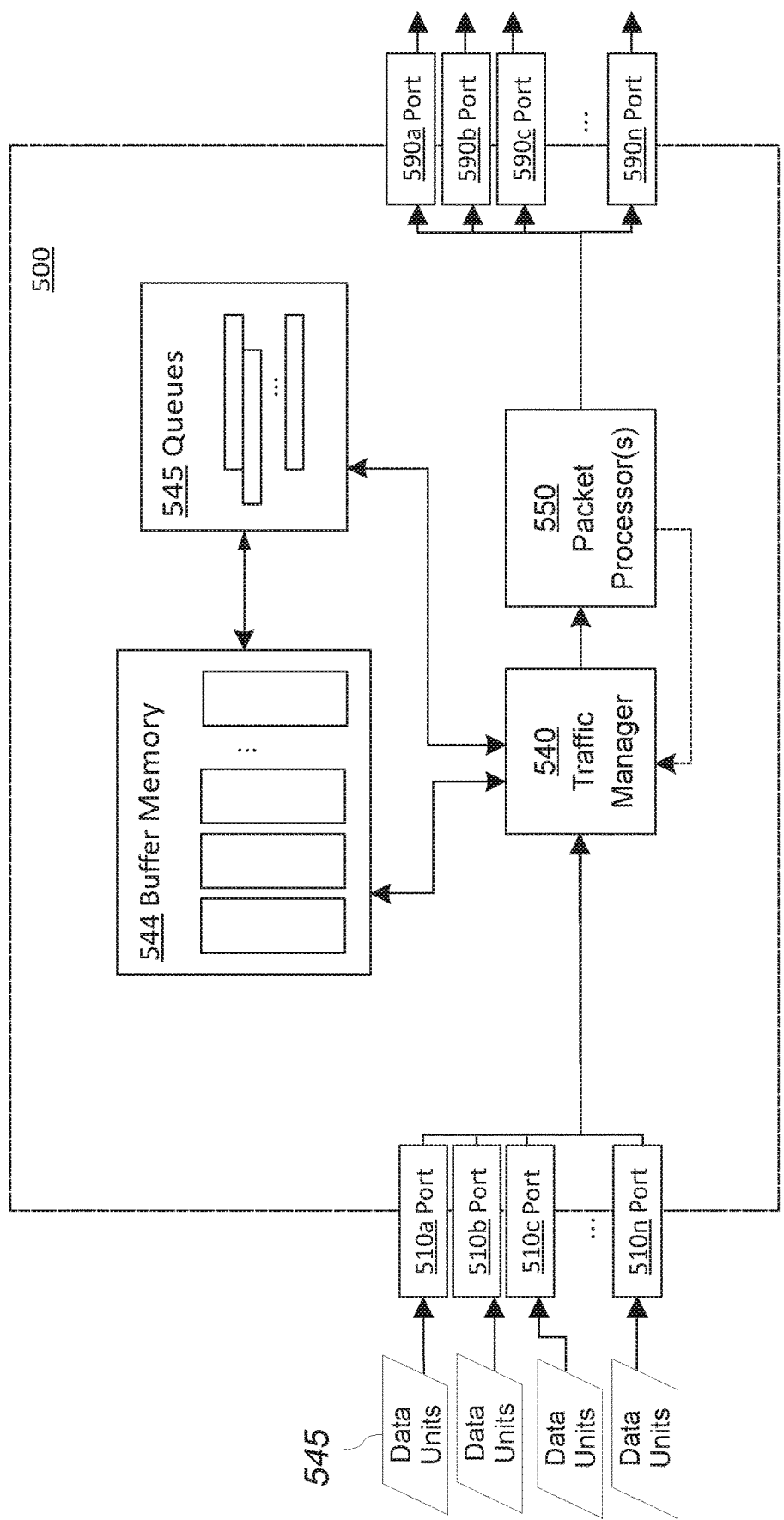
FIG. 5 is an illustrative view of various aspects of an example network device in which techniques described herein may be practiced.

FIG. 5 is an illustrative view of various aspects of an example network device 500 in which techniques described herein may be practiced, according to an embodiment. Network device 500 is a computing device comprising any combination of hardware and software configured to implement the various logical components described herein, including components 510-590. For example, the apparatus may be a single networking computing device, such as a router or switch, in which some or all of the components 510-590 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 510-590.

Device 500 is generally configured to receive and forward data units 505 to other devices in a network, such as network 100, by means of a series of operations performed at various components within the device 500. Note that certain nodes 110 in a system such as network 100 may each be or include a separate network device 500. In an embodiment, a node 110 may include more than one device 500. In an embodiment, device 500 may itself be one of a number of components within a node 110. For instance, network device 500 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 505 through various subcomponents of the switching logic of device 500 is as follows. After being received via a port 510, a data unit 505 may be buffered by an arbiter (not depicted) until the data unit 505 can be processed by an ingress packet processor 550, and then delivered to an interconnect (not depicted). From the interconnect, the data unit 505 may be forwarded to a traffic manager 540. The traffic manager 540 may store the data unit 505 in a buffer 544 and assign the data unit 505 to a queue 545. The traffic manager 540 manages the flow of the data unit 505 through the queue 545 until the data unit 505 is released to an egress packet processor 550. Depending on the processing, the traffic manager 540 may then assign the data unit 505 to another queue so that it may be processed by yet another egress processor 550, or the egress packet processor 550 may send the data unit 505 to an transmit buffer (not depicted) from which the data unit 505 is finally forwarded out another port 590. Of course, depending on the embodiment, the switching logic may omit some of these subcomponents and/or include other subcomponents in varying arrangements.

Example components of a device 500 are now described in further detail.

5.1. Ports

Network device 500 includes ports 510/590, by which the packet-handling logic is coupled to various network interfaces that receive and transmit data units 505. Ports 510, including ports 510a-n, are inbound ("ingress") ports by which data units 505 are received over a network, such as network 100. Ports 590, including ports 590a-n, are outbound ("egress") ports by which at least some of the data units 505 are sent out to other destinations within the network, after having been processed by the network device 500.

Data units 505 may be of any suitable PDU type, such as packets, cells, frames, etc. In an embodiment, data units 505 are packets. However, the individual atomic data units upon which the depicted components operate may actually be subunits of the data units 505. For example, at the port level, data units 505 may be received, acted upon, and even transmitted as cells or other TDUs. These TDUs may be logically linked together as the data units 505 (e.g. PDUs) to which they respectively belong for purposes of determining how to handle the cells or frames. However, the subunits may not actually be assembled into data units 505 within device 500, particularly if the subunits are being forwarded to another destination through device 500.

Ports 510/590 are depicted as separate ports for illustrative purposes, but may actually correspond to the same physical interface hardware on the network device 510. That is, a network device 500 may both receive data units 505 and send data units 505 over a single physical interface, and the single physical interface may thus be logically coupled to both an ingress port 510 and egress port 590. Nonetheless, for various functional purposes, certain logic of the network device 500 may view a single physical interface as a separate ingress port 510 and egress port 590. Moreover, for various functional purposes, certain logic of the network device 500 may subdivide a single physical interface into multiple ingress ports 510 or egress ports 590, or aggregate multiple physical interfaces into a single ingress port 510 or egress port 590. Hence, in various embodiments, ports 510 and 590 should be understood as distinct logical constructs that can be mapped to physical interfaces rather than simply as distinct physical constructs.

In some embodiments, the physical interfaces to which the ports 510/590 of a device 500 are coupled may include various interface components from a MAC layer and/or Physical layer, including one or more transceivers, Serializer/Deserializer ("SerDes") blocks, interface controllers, and/or other suitable components, by which device 500 receives, decodes, descrambles, deserializes, encodes, scrambles, serializes, sends, and/or otherwise processes data units on their way in or out of ports 510/590.

5.2. Packet Processors

A device 500 comprises one or more packet processing components 550. These packet processors 550 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 550 may be configured to perform different packet processing tasks. These tasks may include, for example, identifying paths along which to forward data units 505, forwarding data units 505 to egress ports 590, implementing flow control and/or other policies, manipulating packets, performing statistical or debugging operations, and so forth. A device 500 may comprise any number of packet processors 550 configured to perform any number of processing tasks.

In an embodiment, the packet processors 550 within a device 500 may be arranged such that the output of one packet processor 550 may, eventually, be inputted into another packet processor 550, in such a manner as to pass data units 505 from certain packet processor(s) 550 to other packet processor(s) 550 in a sequence of stages, until finally disposing of the data units 505 (e.g. by sending the data units 505 out an egress port 590, "dropping" the data units 505, etc.). The exact set and/or sequence of packet processors 550 that process a given data unit 505 may vary, in some embodiments, depending on attributes of the data unit 505 and/or the state of the device 500. Any number of packet processors 550 may be chained together in this manner.

Based on decisions made while processing a data unit 505, a packet processor 550 may, in some embodiments, and/or for certain processing tasks, manipulate a data unit 505 directly. For instance, the packet processor 550 may add, delete, or modify information in a data unit header or payload. In other embodiments, and/or for other processing tasks, a packet processor 550 may generate control information that accompanies the data unit 505, or is merged with the data unit 505, as the data unit 505 continues through the device 500. This control information may then be utilized by other components of the device 500 to implement decisions made by the packet processor 550.

In an embodiment, a packet processor 550 need not necessarily process an entire data unit 505, but may rather only receive and process a subunit of a data unit 505, such as a TDU comprising header information for the data unit. For instance, if the data unit 505 is a packet comprising multiple cells, the first cell, or a first subset of cells, might be forwarded to a packet processor 550, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 550 or an egress packet processor 550. Generally, an ingress processor 550 resolves destinations for a traffic manager 540 to determine which ports 590 and/or queues 545 a data unit 505 should depart from. There may be any number of ingress processors 550, including just a single ingress processor 550.

In an embodiment, an ingress processor 550 performs certain intake tasks on data units 505 as they arrive. These intake tasks may include, for instance, and without limitation, parsing data units 505, performing routing related lookup operations, categorically blocking data units 505 with certain attributes and/or when the device 500 is in a certain state, duplicating certain types of data units 505, making initial categorizations of data units 505, and so forth. Once the appropriate intake task(s) have been performed, the data units 505 are forwarded to an appropriate traffic manager 540, to which the ingress processor 550 may be coupled directly or via various other components, such as an interconnect component.

The egress packet processor(s) 550 of a device 500, by contrast, may be configured to perform non-intake tasks necessary to implement the switching logic of the device 500. These tasks may include, for example, tasks such as identifying paths along which to forward the data units 505, implementing flow control and/or other policies, manipulating data units, performing statistical or debugging operations, and so forth. In an embodiment, there may be different egress packet processors(s) 550 assigned to different flows or other categories of traffic, such that not all data units 505 will be processed by the same egress packet processor 550.

In an embodiment, each egress processor 550 is coupled to a different group of egress ports 590 to which they may send data units 505 processed by the egress processor 550. In an embodiment, access to a group of ports 590 may be regulated via an egress arbiter coupled to the egress packet processor 550. In some embodiments, an egress processor 550 may also or instead be coupled to other potential destinations, such as an internal central processing unit, a storage subsystem, or a traffic manager 540.

5.3 Buffers

Since not all data units 505 received by the device 500 can be processed by the packet processor(s) 550 at the same time, various components of device 500 may temporarily store data units 505 in one or more buffers 544 while the data units 505 are waiting to be processed. For example, a certain packet processor 550 may only be capable of processing a certain number of data units 505, or portions of data units 505, in a given clock cycle, meaning that other data units

505, or portions of data units 505, destined for the packet processor 550 must either be ignored (e.g., dropped) or stored. At any given time, a large number of data units 505 may be stored in the buffers 544 of the device 500, depending on network traffic conditions.

A device 500 may include a variety of buffers 544, each utilized for varying purposes and/or components. Generally, a data unit 505 awaiting processing by a component is held in a buffer 544 associated with that component until the data unit 505 is "released" to the component for processing. For example, a traffic manager 540 will typically have a relatively large buffer 544, referred to as an egress buffer, in which it buffers data units 505 prior to releasing those data units 550 to an egress packet processor 550.

A buffer 544 may be implemented using a single physical memory unit (e.g. SRAM, DRAM, etc.), a designated portion of a memory unit, or a collection of memory units, depending on an embodiment. The buffer 544 is divided into addressable units, or entries, that store SDUs, one or more of which form a TDU, as explained elsewhere. Each TDU stored in a buffer 544 belongs to a PDU. However, the data for the SDUs and/or TDUs that belong to a PDU may not necessarily be stored adjacent to each other. If one wishes to reconstruct a PDU based on the buffered SDUs, one might be unable to do so using the buffer memory alone. Therefore, in an embodiment, a buffer 544 may further store or be associated with linking data that indicates which SDUs belong to a given TDU and/or which TDUs belong to a given PDU, also referred to as intra-packet link data.

For each PDU, buffer 544 may further store or be associated with various PDU metadata. The PDU metadata may include any suitable information about a PDU, such as a PDU identifier, location(s) of linking data for the PDU (e.g. the address(es) of intra-packet entr(ies) at which the linked list(s) for the PDU start), a count of TDUs in the PDU, source information, destination information, control information, timestamps, statistics, an assigned queue, flow control information, and so forth.

5.4. Queues

In an embodiment, to manage the order in which data units 505 are processed from buffers 544, various components of a device 500 may implement queueing logic. For example, the flow of data units 505 through the egress buffers 544 of traffic manager 540 may be managed using egress queues while the flow of data units 505 through the buffers of an ingress arbiter might be managed using ingress queues.

A queue 545 is a set of nodes arranged in some order by metadata describing the queue 545. The queue 545 includes a head node, or head, which is typically the next node to be processed, and a tail node, or tail, which is typically the node most recently added to the queue. A node will typically progress from the tail to the head over time as other nodes are processed and removed from the queue.

In the case of queue 545, the nodes are data unit 505, or the buffer locations(s) at which the data unit 505 begins. A data unit 505 that has been added to a queue 545 is said to be "linked" to that queue 545. A data unit 505 may belong to one or more queues 545.

In many embodiments, the sequence in which the queue 545 arranges its constituent data units 505 generally corresponds to the order in which the data units 505 or data unit portions in the queue 545 will be released and processed. Such queues 545 are known as first-in-first-out ("FIFO") queues, though in other embodiments other types of queues may be utilized. In some embodiments, the number of data units 505 or data unit portions assigned to a given queue 545 at a given time may be limited, either globally or on a per-queue basis, and this limit may change over time.

In an embodiment, queues 545 are implemented using a linking memory referred to an "inter-packet" link memory, which is separate from the associated buffer memory 544. Each entry in the link memory is said to be a node in the queue. Each link entry points comprises a data pointer, which, when the link entry is occupied, points to a memory location in the buffer memory 544 at which a corresponding data unit (or at least the start of the data unit) is found (e.g. a buffer entry, a first entry for the data unit in an intra-packet link memory, etc.). Each entry in the link memory further may further comprises a link pointer to another link entry, which corresponds to the next node in the queue. Of course, in other embodiments, other types of linking memories and/or other structures may instead be utilized instead to represent the queue.

5.5 Traffic Management

According to an embodiment, a device 500 further includes one or more traffic managers 540 configured to control the flow of data units 505 to one or more packet processor(s) 550. A traffic manager 540 may receive data units 505 directly from a port 510, from an ingress processor 550, and/or other suitable components of device 500. In an embodiment, the traffic manager 540 is configured to receive up to one TDU from each possible source (e.g. each port 510) each clock cycle of the traffic manager 540.

Traffic manager 540 may include or be coupled to buffers 544 for buffering data units 505 prior to sending those data units 505 to their respective processor(s) 550. A buffer manager within the traffic manager 540 may temporarily store data units 505 in buffers 544 as they await processing by processor(s) 550. A data unit 505 or data unit portion in a buffer 544 may eventually be "released" to one or more processor(s) 550 for processing, by reading the data unit 505 from the buffer 544 and sending the data unit 505 to the processor(s) 550. In an embodiment, traffic manager 540 may release up to a certain number of data units 505 from buffers 544 to processors 550 each clock cycle.

Beyond managing the use of buffers 544 to store data units 505 (or copies thereof), a traffic manager 540 may include queue management logic configured to assign data units 505 to queues 545 and manage the flow of data units 505 through queues 545. The traffic manager 540 may, for instance, "enqueue" a PDU that has been fully buffered by identifying a specific queue 545 to assign the PDU to, and then linking a PDU identifier or other PDU metadata to the assigned queue. The traffic manager 540 may further determine when to release—also referred to as dequeuing—data units 505 from queues 545 by sending instructions to the buffer manager 544 to read/release the data units 505 and then providing the data read from the buffer 544 to specific packet processor(s) 550.

In an embodiment, different queues 545 may exist for different sources or destinations. For example, each port 510 and/or port 590 may have its own set of queues 545. The queue 545 to which an incoming data unit 505 is assigned and linked may, for instance, be selected based on forwarding information indicating which port 590 the data unit 505 should depart from. In an embodiment, a different egress processor 550 may be associated with each different set of one or more queues 545. In an embodiment, the current processing context of the data unit 505 may be used to select which queue 545 a data unit 505 should be assigned to.

In an embodiment, there may also or instead be different queues 545 for different flows or sets of flows. That is, each identifiable traffic flow or group of traffic flows is assigned its own set of queues 545 to which its data units 505 are respectively assigned. In an embodiment, different queues 545 may correspond to different classes of traffic or quality-of-service (QoS) levels. Different queues 545 may also or instead exist for any other suitable distinguishing properties of the data units 505, such as source address, destination address, packet type, and so forth.

Though only one packet processor 550 and traffic manager 540 are depicted, a device 500 may comprise any number of packet processors 550 and traffic managers 540. For instance, different sets of ports 510 and/or ports 590 may have their own traffic manager 540 and packet processors 550. As another example, in an embodiment, the traffic manager 540 may be duplicated for some or all of the stages of processing a data unit. For example, system 500 may include a traffic manager 540 and egress packet processor 550 for an egress stage performed upon the data unit 505 exiting the system 500, and/or a traffic manager 540 and packet processor 550 for any number of intermediate stages. The data unit 505 may thus pass through any number of traffic managers 540 and/or packet processors 550 prior to exiting the system 500. In other embodiments, only a single traffic manager 540 is needed. If intermediate processing is needed, flow of a data unit 505 may loop back to the traffic manager 540 for buffering and/or queuing after each stage of intermediate processing.

In an embodiment, a traffic manager 540 is coupled to the output of an ingress packet processor(s) 550, such that data units 505 (or portions thereof) are assigned to buffers 544 only upon being initially processed by an ingress packet processor 550. Once in an egress buffer 544, a data unit 505 (or portion thereof) may be "released" to one or more egress packet processor(s) 550 for processing.

In the course of processing a data unit 505, a device 500 may replicate a data unit 505 one or more times for purposes such as, without limitation, multicasting, mirroring, debugging, and so forth. For example, a single data unit 505 may be replicated to multiple egress queues 545. For instance, a data unit 505 may be linked to separate queues 545 for each of ports 1, 3, and 5. As another example, a data unit 505 may be replicated a number of times after it reaches the head of a queue 545 (e.g. for different egress processors 550). Hence, though certain techniques described herein may refer to the original data unit 505 that was received by the device 500, it will be understood that those techniques will equally apply to copies of the data unit 505 that have been generated for various purposes. A copy of a data unit 505 may be partial or complete. Moreover, there may be an actual physical copy of the data unit 505 in buffers 544, or a single copy of the data unit 505 may be linked from a single buffer location to multiple queues 545 at the same time.

5.6. Forwarding Logic

The logic by which a device 500 determines how to handle a data unit 505—such as where and whether to send a data unit 505, whether to perform additional processing on a data unit 505, etc.—is referred to as the forwarding logic of the device 500. This forwarding logic is collectively implemented by a variety of the components of the device 500, such as described above. For example, an ingress packet processor 550 may be responsible for resolving the destination of a data unit 505 and determining the set of actions/edits to perform on the data unit 505, and an egress packet processor 550 may perform the edits. Also, there may be embodiments where the ingress packet processor 550 performs edits as well.

The forwarding logic may be hard-coded and/or configurable, depending on the embodiment. For example, the forwarding logic of a device 500, or portions thereof, may, in some instances, be at least partially hard-coded into one or more ingress processors 550 and/or egress processors 550. As another example, the forwarding logic, or elements thereof, may also be configurable, in that the logic changes over time in response to analyses of state information collected from, or instructions received from, the various components of the device 500 and/or other nodes in the network in which the device 500 is located.

In an embodiment, a device 500 will typically store in its memories one or more forwarding tables (or equivalent structures) that map certain data unit attributes or characteristics to actions to be taken with respect to data units 505 having those attributes or characteristics, such as sending a data unit 505 to a selected path, or processing the data unit 505 using a specified internal component. For instance, such attributes or characteristics may include a Quality-of-Service level specified by the data unit 505 or associated with another characteristic of the data unit 505, a flow control group, an ingress port 510 through which the data unit 505 was received, a tag or label in a packet's header, a source address, a destination address, a packet type, or any other suitable distinguishing property. The forwarding logic may, for example, read such a table, determine one or more ports 590 to send a data unit 505 to based on the table, and add or associate the data unit 505 with information that indicates to downstream logic to send the data unit 505 along a path that includes a specific traffic manager 540 and/or egress processor 550 that is coupled to the one or more ports 590.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 510/590. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 505 are routed through different nodes in a network, the nodes may, on occasion, discard, fail to send, or fail to receive certain data units 505, thus resulting in the data units 505 failing to reach their intended destination. The act of discarding of a data unit 505, or failing to deliver a data unit 505, is typically referred to as "dropping" the data unit. Instances of dropping a data unit 505, referred to herein as "drops" or "packet loss," may occur for a variety of reasons, such as resource limitations, errors, or deliberate policies. Different components of a device 500 may make the decision to drop a data unit 505 for various reasons. For instance, a traffic manager 540 may determine to drop a data unit 505 because, among other reasons, buffers 544 are overutilized, a queue 545 is over a certain size, and/or a data unit 505 has a certain characteristic.

5.7. Multi-Pipeline Architecture

Figure 6:
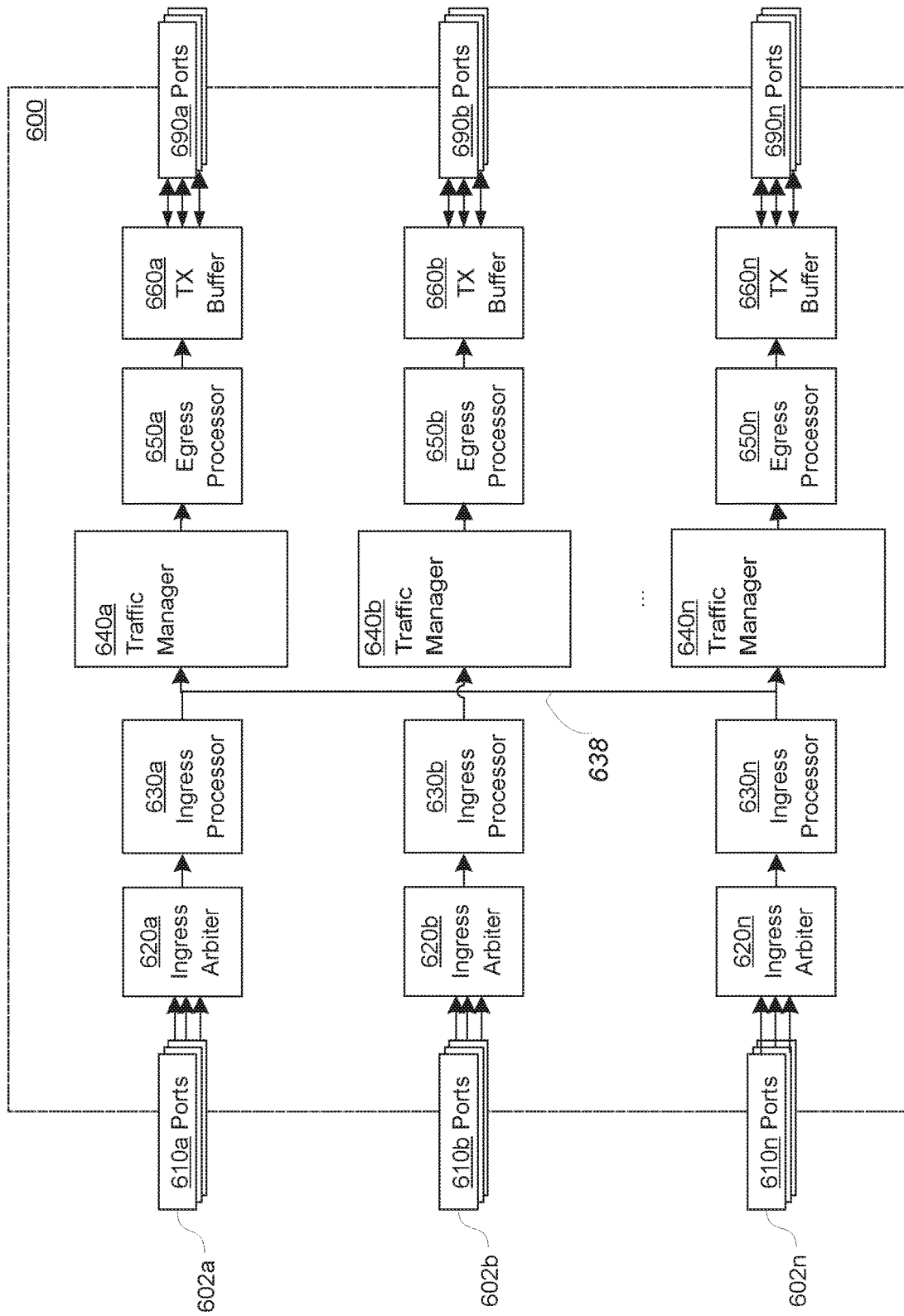
FIG. 6 illustrates an example of one such network device with multiple packet processing pipelines.

In an embodiment, a network device may include multiple pipelines of data unit processing components such as those described above. FIG. 6 illustrates an example of one such network device with multiple packet processing pipelines, according to an embodiment. Network device 600 includes a plurality of ingress ports 610 and egress ports 690, similar to the ingress ports 510 and egress ports 590 of device 500. The ingress ports 610 are divided into port groups 610*a-n*, and each group of ports 610 feeds data units to a different pipeline 602 of processing components. There may be any number of groups of ports 610, and hence any number of corresponding pipelines 602.

Each pipeline includes an ingress arbiter 620. Each ingress arbiter 620 is coupled to a corresponding group of ingress ports 610, and receives data units from those ports 610. In some respects, each ingress arbiter 620 may be viewed as an ingress version of traffic manager 540. An ingress arbiter 620 is responsible for determining when data units are sent to downstream components, and in particular to an ingress packet processor 630 that is coupled to the ingress arbiter 620 within a corresponding pipeline 602. An ingress arbiter 620 may or may not include its own buffer memory in which it buffers data unit that await processing, depending on the embodiment.

In an embodiment, the data units sent by the ingress arbiter 620 are actually subunits, such as cells, frames, segments, or other TDUs, of larger parent data units, such as packets or other PDUs. The ingress arbiter 620 may, in an embodiment, divide a larger data unit (or ensure that the larger data unit is divided) into these subunits prior to transmitting the data units to the corresponding ingress packet processor 630. In an embodiment, a packet or other PDU may arrive at the ingress arbiter 620 as a set of TDUs. For convenience, examples are given herein where the TDU is a cell, and the PDU is a packet, but it will be appreciated that the cell may in fact be any type of subunit, and the packet may in fact be any larger data unit that comprises those subunits.

Each pipeline 602 further includes an ingress packet processor 630 to which its ingress arbiter 620 eventually sends these data units. Each ingress packet processor 630, meanwhile, functions in similar manner as an ingress packet processor 550 described above. In particular, an ingress packet processor 630 performs forwarding tasks such as resolving the data unit destination, adding or removing headers, and so forth. For instance, the ingress packet processor 630 may be responsible for generating control information that instructs downstream components of the pipelines 602 on how to handle the data unit, and this control information may either be inserted into the data unit, or be conveyed along with the data unit as sideband information.

Each pipeline 602 further includes an egress traffic manager 640, which functions in similar manner to the traffic manager 540. A common interconnect 638 is coupled to each ingress packet processor 630 on one end and each egress traffic manager 640 on the other. The interconnect 638 conveys data units to traffic manager(s) 640 indicated by the ingress packet processors 630 (e.g. based on the control information), thereby allowing data units to "switch" pipelines 602 should their destination(s) include a port 690 that is not on the same pipeline 602 as the ingress port 610 through which the data unit was received. Ingress packet processors 630 may be coupled to the interconnect 638 directly, or indirectly via other components such as a merger unit (e.g. that merges a control portion of the data unit processed by the packet processor 630 with a data portion of the data unit that bypasses the packet processor 630).

A pipeline's egress traffic manager 640 then regulates the flow of data units to the pipeline's egress packet processor 650, in similar manner as described with respect to traffic manager 540. The egress packet processor 650 processes data units in similar manner as described with respect egress packet processors 550. The egress packet processors then forward the processed data units to a transmit buffer for the pipeline's egress port transmit unit 660, which is responsible for transmission of data units out a set of one or more egress ports 690 belonging to the pipeline 602. The set of egress ports 690 for a pipeline corresponds to the pipeline's ingress ports 610.

In yet other embodiments, an egress traffic manager 640 and/or other components may be shared between such pipelines.

5.8. Miscellaneous

Devices 500 and 600 illustrate only several of many possible arrangements of components in a network device configured to provide the functionality described herein. Other arrangements may include fewer, additional, or different components, and the division of work between the components may vary depending on the arrangement.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 7:
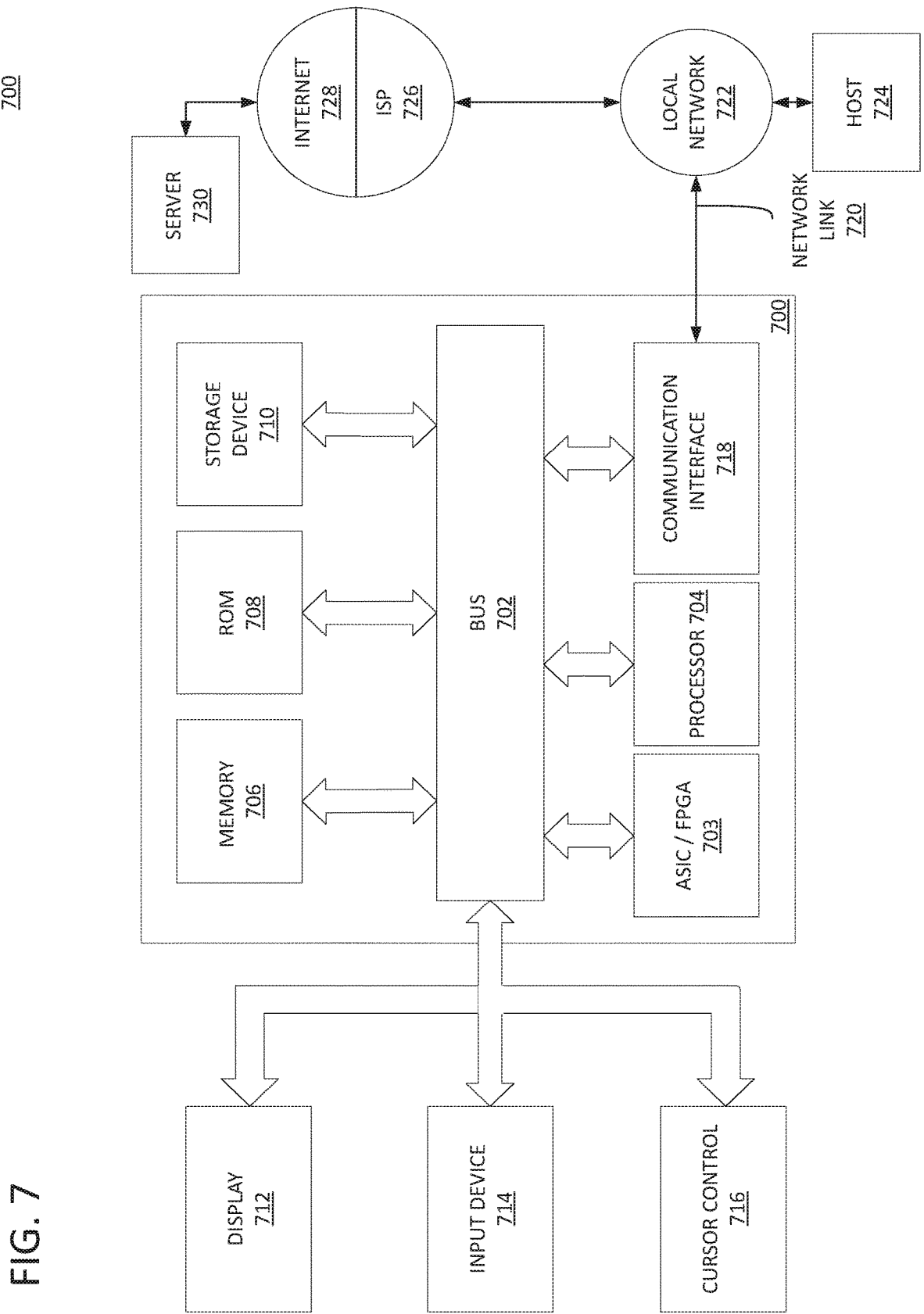
FIG. 7 is a block diagram that illustrates an example computer system that may be utilized in implementing the above-described techniques.

FIG. 7 is a block diagram that illustrates an example computer system 700 that may be utilized in implementing the above-described techniques, according to an embodiment. Computer system 700 may be, for example, a desktop computing device, laptop computing device, tablet, smartphone, server appliance, computing mainframe, multimedia device, handheld device, networking apparatus, or any other suitable device. In an embodiment, FIG. 7 constitutes a different view of the devices and systems described in previous sections.

Computer system 700 may include one or more ASICs, FPGAs, or other specialized circuitry 703 for implementing program logic as described herein. For example, circuitry 703 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 700 may include one or more hardware processors 704 configured to execute software-based instructions. Computer system 700 may also include one or more busses 702 or other communication mechanism for communicating information. Busses 702 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 700 also includes one or more memories 706, such as a RAM, hardware registers, or other dynamic or volatile storage device for storing data units to be processed by the one or more ASICs, FPGAs, or other specialized circuitry 703. Memory 706 may also or instead be used for storing information and instructions to be executed by processor 704. Memory 706 may be directly connected or embedded within circuitry 703 or a processor 704. Or, memory 706 may be coupled to and accessed via bus 702. Memory 706 also may be used for storing temporary variables, data units describing rules or policies, or other intermediate information during execution of program logic or instructions.

Computer system 700 further includes one or more read only memories (ROM) 708 or other static storage devices coupled to bus 702 for storing static information and instructions for processor 704. One or more storage devices 710, such as a solid-state drive (SSD), magnetic disk, optical disk, or other suitable non-volatile storage device, may optionally be provided and coupled to bus 702 for storing information and instructions.

A computer system 700 may also include, in an embodiment, one or more communication interfaces 718 coupled to bus 702. A communication interface 718 provides a data communication coupling, typically two-way, to a network link 720 that is connected to a local network 722. For example, a communication interface 718 may be an integrated services digital network (ISDN) card, cable modem, satellite modem, or a modem to provide a data communication connection to a corresponding type of telephone line. As another example, the one or more communication interfaces 718 may include a local area network (LAN) card to provide a data communication connection to a compatible LAN. As yet another example, the one or more communication interfaces 718 may include a wireless network interface controller, such as an 802.11-based controller, Bluetooth controller, Long Term Evolution (LTE) modem, and/or other types of wireless interfaces. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by a Service Provider 726. Service Provider 726, which may for example be an Internet Service Provider (ISP), in turn provides data communication services through a wide area network, such as the world-wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

In an embodiment, computer system 700 may send and receive data units through the network(s), network link 720, and communication interface 718. In some embodiments, this data may be data units that the computer system 700 has been asked to process and, if necessary, redirect to other computer systems via a suitable network link 720. In other embodiments, this data may be instructions for implementing various processes related to the described techniques. For instance, in the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. As another example, information received via a network link 720 may be interpreted and/or processed by a software component of the computer system 700, such as a web browser, application, or server, which in turn issues instructions based thereon to a processor 704, possibly via an operating system and/or other intermediate layers of software components.

Computer system 700 may optionally be coupled via bus 702 to one or more displays 712 for presenting information to a computer user. For instance, computer system 700 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 712 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 712.

One or more input devices 714 are optionally coupled to bus 702 for communicating information and command selections to processor 704. One example of an input device 714 is a keyboard, including alphanumeric and other keys. Another type of user input device 714 is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Yet other examples of suitable input devices 714 include a touch-screen panel affixed to a display 712, cameras, microphones, accelerometers, motion detectors, and/or other sensors. In an embodiment, a network-based input device 714 may be utilized. In such an embodiment, user input and/or other information or commands may be relayed via routers and/or switches on a Local Area Network (LAN) or other suitable shared network, or via a peer-to-peer network, from the input device 714 to a network link 720 on the computer system 700.

As discussed, computer system 700 may implement techniques described herein using customized hard-wired logic, one or more ASICs or FPGAs 703, firmware and/or program logic, which in combination with the computer system causes or programs computer system 700 to be a special-purpose machine. According to one embodiment, however, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media may also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 700 may receive the data on the network and demodulate the signal to decode the transmitted instructions. Appropriate circuitry may then place the data on bus 702. Bus 702 carries the data to main memory 706, from which processor 704 retrieves and executes the instructions. The instructions received by main memory 706 may optionally be stored on storage device 710 either before or after execution by processor 704.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system, comprising:
one or more network devices comprising:
a plurality of communication interfaces configured to receive data units;
packet-switching logic configured to identify destinations for the data units and forward the data units out specific communication interfaces, of the communication interfaces, that are mapped to those destinations;
wherein the one or more network devices include:
a first network device configured to:
when one or more telemetry trigger conditions occur, generate a telemetry data unit by:
selecting a data unit from a buffer of a data unit processing pipeline of the first network device that is among a plurality of data units received by the first network device;
creating at least a partial clone of the data unit that includes header data of the data unit; and
inserting telemetry data in the at least the partial clone of the data unit; and
forward the data unit and the telemetry data unit along a same path to a same destination based on same header data in both the data unit and the telemetry data unit via the data unit processing pipeline.

2. The system of claim 1, wherein the one or more network devices further include:
a second network device configured to:
receive the data unit and the telemetry data unit;
extract the telemetry data from the telemetry data unit; and
send telemetry report data derived from the telemetry data unit to a telemetry collector.

3. The system of claim 2, wherein the second network device is further configured to continue forwarding the data unit along the path to the destination.

4. The system of claim 1, wherein the one or more network devices further include:
one or more transit devices, each device of the one or more transit devices configured to:
receive the data unit and the telemetry data unit;
update the telemetry data in the telemetry data unit based on additional telemetry data collected at the transit device;
continue forwarding the data unit and the telemetry data unit along the path to the destination.

5. The system of claim 1, wherein the one or more network devices further include:
a second network device configured to:
receive the data unit and the telemetry data unit;
extract the telemetry data from the telemetry data unit; and
send telemetry report data derived from the telemetry data unit to a telemetry collector;
one or more transit devices, each device of the one or more transit devices configured to:
receive the data unit and the telemetry data unit;
update the telemetry data in the telemetry data unit based on additional telemetry data collected at the transit device; and
continue forwarding the data unit and the telemetry data unit along the path to the destination;
wherein the one or more network devices form a telemetry domain within a data center, the telemetry domain including a plurality of edge devices that are configured in a same manner as the first network device and the network second device, wherein the one or more transit network devices include a plurality of transit devices that interconnect the edge devices.

6. The system of claim 5, wherein the telemetry collector is a separate device in the telemetry domain to which a plurality of the edge devices send telemetry information, including the telemetry report data, derived from telemetry data units.

7. The system of claim 1, wherein the telemetry data includes one or more of: an identifier of the first network device, an ingress port identifier, an egress port identifier, an ingress timestamp, an egress timestamp, a queue identifier, a queue length, a congestion measure, a buffer fill measure, or a delay measure.

8. A method, comprising:
receiving, by a network device, data units via one or more communication interfaces;
identifying, by the network device, destinations for the data units;
responsive to determining that one or more telemetry triggering conditions have been met by a data unit:
generating, by the network device, a telemetry data unit by at least partially cloning the data unit from a buffer of a data unit processing pipeline of the network device, the at least partial clone of the data unit includes header data of the data unit;
inserting, by the network device, telemetry data in the telemetry data unit; and
forwarding, by the network device, the data unit and the telemetry data unit along a same path to a same destination based on same header data in both the data unit and the telemetry data unit via the data unit processing pipeline.

9. The method of claim 8, further comprising:
receiving, by a second network device, the data unit and the telemetry data unit;
extracting, by the second network device, the telemetry data from the telemetry data unit; and
sending, by the second network device, telemetry report data derived from the telemetry data unit to a telemetry collector.

10. The method of claim 9, wherein the second network device further comprises forwarding the data unit along the path to the destination.

11. The method of claim 8, further comprising:
receiving, by a transit device, the data unit and the telemetry data unit;
updating, by the transit device, the telemetry data in the telemetry data unit based on additional telemetry data collected at the device;

forwarding, by the transit device, the data unit and the telemetry data unit along the path to the destination.

12. The method of claim 8, further comprising:
receiving, by a second network device, the data unit and the telemetry data unit;
extracting, by the second network device, the telemetry data from the telemetry data unit;
sending, by the second network device, telemetry report data derived from the telemetry data unit to a telemetry collector;
receiving, by a transit device, the data unit and the telemetry data unit;
updating, by the transit device, the telemetry data in the telemetry data unit based on additional telemetry data collected at the transit device;
forwarding, by the transit device, the data unit and the telemetry data unit along the path to the destination;
wherein the one or more network devices form a telemetry domain within a data center, the telemetry domain including a plurality of edge devices, wherein one or more transit devices interconnect the edge devices.

13. The method of claim 12, wherein the telemetry collector is a separate device in the telemetry domain to which a plurality of the edge devices send telemetry information, including the telemetry report data, derived from telemetry data units.

14. The method of claim 8, wherein the telemetry data includes one or more of: an identifier of the network device, an ingress port identifier, an egress port identifier, an ingress timestamp, an egress timestamp, a queue identifier, a queue length, a congestion measure, a buffer fill measure, or a delay measure.

15. One or more non-transitory computer-readable storage media, storing one or more sequences of instructions, which when executed by one or more processors cause performance of:
receiving, by a network device, data units via one or more communication interfaces;
identifying, by the network device, destinations for the data units;
responsive to determining that one or more telemetry triggering conditions have been met by a data unit:
generating, by the network device, a telemetry data unit by at least partially cloning the data unit from a buffer of a data unit processing pipeline of the network device, the at least partial clone of the data unit includes header data of the data unit;
inserting, by the network device, telemetry data in the telemetry data unit; and
forwarding, by the network device, the data unit and the telemetry data unit along a same path to a same destination based on same header data in both the data unit and the telemetry data unit via the data unit processing pipeline.

16. The one or more non-transitory computer-readable storage media of claim 15, further comprising:
receiving, by a second network device, the data unit and the telemetry data unit;
extracting, by the second network device, the telemetry data from the telemetry data unit; and
sending, by the second network device, telemetry report data derived from the telemetry data unit to a telemetry collector.

17. The one or more non-transitory computer-readable storage media of claim 16, wherein the second network device further comprises forwarding the data unit along the path to the destination.

18. The one or more non-transitory computer-readable storage media of claim 15, further comprising:
receiving, by a transit device, the data unit and the telemetry data unit;
updating, by the transit device, the telemetry data in the telemetry data unit based on additional telemetry data collected at the device;
forwarding, by the transit device, the data unit and the telemetry data unit along the path to the destination.

19. The one or more non-transitory computer-readable storage media of claim 15, further comprising:
receiving, by a second network device, the data unit and the telemetry data unit;
extracting, by the second network device, the telemetry data from the telemetry data unit;
sending, by the second network device, telemetry report data derived from the telemetry data unit to a telemetry collector;
receiving, by a transit device, the data unit and the telemetry data unit;
updating, by the transit device, the telemetry data in the telemetry data unit based on additional telemetry data collected at the transit device;
forwarding, by the transit device, the data unit and the telemetry data unit along the path to the destination;
wherein the one or more network devices form a telemetry domain within a data center, the telemetry domain including a plurality of edge devices, wherein one or more transit devices interconnect the edge devices.

20. The one or more non-transitory computer-readable storage media of claim 19, wherein the telemetry collector is a separate device in the telemetry domain to which a plurality of the edge devices send telemetry information, including the telemetry report data, derived from telemetry data units.

* * * * *